US010999133B2

(12) United States Patent
Kadiri et al.

(10) Patent No.: US 10,999,133 B2
(45) Date of Patent: May 4, 2021

(54) DEVICES AND METHODS FOR FACILITATING OPTIMIZATION OF PUBLIC LAND MOBILITY NETWORK CONFIGURATION FOR A SYSTEM INFORMATION BLOCK

(71) Applicant: QUALCOMM Incorporated, San Diego, CA (US)

(72) Inventors: Prasad Kadiri, San Diego, CA (US); Umesh Phuyal, San Diego, CA (US); Luis Fernando Brisson Lopes, Swindon (GB); Haris Zisimopoulos, London (GB); Gavin Bernard Horn, La Jolla, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 16/351,012

(22) Filed: Mar. 12, 2019

(65) Prior Publication Data

US 2019/0288909 A1    Sep. 19, 2019

Related U.S. Application Data

(60) Provisional application No. 62/642,981, filed on Mar. 14, 2018, provisional application No. 62/666,052, filed on May 2, 2018.

(51) Int. Cl.
*H04L 12/24* (2006.01)
*H04W 4/06* (2009.01)
(Continued)

(52) U.S. Cl.
CPC ........... *H04L 41/0803* (2013.01); *H04W 4/06* (2013.01); *H04W 48/18* (2013.01); *H04W 48/12* (2013.01); *H04W 84/042* (2013.01)

(58) Field of Classification Search
CPC .................................................. H04L 41/0803
See application file for complete search history.

(56) References Cited

U.S. PATENT DOCUMENTS

| 10,534,932 B2 * | 1/2020 | Wang ..................... H04W 8/005 |
| 2016/0073335 A1 * | 3/2016 | Liao ....................... H04W 36/08 |
| | | 370/329 |

(Continued)

FOREIGN PATENT DOCUMENTS

EP    2613596 A1    7/2013

OTHER PUBLICATIONS

Huawei et al., "Handling on E-UTRA Cell Which Only Connects to 5G Core", 3GPP Draft; R2-1708395 Handling on E-UTRA Cell Which Only Connects to 5G Core, 3rd Generation Partnership Project (3GPP), Mobile Competence Centre; 650, Route Des Lucioles; F-06921 Sophia-Antipolis, vol. RAN WG2, No. Berlin, Germany; Aug. 21, 2017-Aug. 25, 2017, Aug. 20, 2017 (Aug. 20, 2017), XP051318259, 3 Pages,Retrieved from the Internet:URL:http:// www.3gpp.org/ftp/Meetings_3GPP_Sync/RAN2/Docs/ [retrieved on Aug. 20, 2017], 2 Discussion.

(Continued)

*Primary Examiner* — Raj Jain
*Assistant Examiner* — Andrew C Lee
(74) *Attorney, Agent, or Firm* — Loza & Loza, LLP

(57) ABSTRACT

Aspects encompassing public land mobile network (PLMN) configurations are disclosed. In one example, first and second PLMN configurations are determined, and a parameter having a common identifier between a hybrid PLMN and a PLMN from a different PLMN configuration is identified, such that the hybrid PLMN may connect with a first or second core network type. Inclusion of the common identifier is limited to either the first or second PLMN configuration via an index, and the first and second PLMN (Continued)

configurations are transmitted. In another example, first and second PLMN configurations are received, and a hybrid PLMN in one of the two PLMN configurations is selected. A determination is made whether to use the hybrid PLMN to connect with a first or second core network type. Whether a hybrid PLMN parameter was ascertained via the first or second PLMN configuration is reported. Other aspects, embodiments, and features are also included.

30 Claims, 16 Drawing Sheets

(51) Int. Cl.
  *H04W 48/18* (2009.01)
  *H04W 84/04* (2009.01)
  *H04W 48/12* (2009.01)

(56) References Cited

U.S. PATENT DOCUMENTS

| | | | | |
|---|---|---|---|---|
| 2017/0099612 | A1* | 4/2017 | Salot | H04W 28/0215 |
| 2017/0337394 | A1* | 11/2017 | Wang | H04L 67/16 |
| 2017/0339609 | A1* | 11/2017 | Youn | H04W 76/11 |
| 2017/0353915 | A1* | 12/2017 | da Silva | H04W 48/18 |
| 2018/0035399 | A1* | 2/2018 | Xu | H04W 8/06 |
| 2018/0176768 | A1* | 6/2018 | Baek | H04W 8/205 |
| 2018/0234894 | A1* | 8/2018 | Jiang | H04W 36/0033 |
| 2018/0288582 | A1* | 10/2018 | Buckley | H04W 48/14 |
| 2019/0021043 | A1* | 1/2019 | Youn | H04W 36/0055 |
| 2019/0124589 | A1* | 4/2019 | Bogineni | H04W 36/0022 |
| 2019/0246335 | A1* | 8/2019 | Mukherjee | H04L 63/10 |
| 2020/0092790 | A1* | 3/2020 | Salkintzis | H04W 40/00 |

OTHER PUBLICATIONS

Nokia et al., "Consequences of 5GC-Only eNBs",3GPP Draft; R2-1707816 5GC-Only Cells, 3rd Generation Partnership Project (3GPP), Mobile Competence Centre ;650, Route Des Lucioles; F-06921 Sophia-Antipolis Cedex;France, vol. RAN WG2, No. Berlin, Germany; Aug. 21, 2017-Aug. 25, 2017, Aug. 20, 2017, (Aug. 20, 2017), XP051317766, 10 Pages,Retrieved from the Internet:URL:http://www.3gpp.org/ftp/Meetings_3GPP_Sync/RAN2/Docs/ [retrieved on Aug. 20, 2017], 3.2 Rel-15 and later UEs.

Qualcomm Incorporated: "Preventing Legacy LTE UEs from Camping on eLTE Cells & PLMNs Connected to New 5G Core Network Only",3GPP Draft; R2-1712264 Preventing Legacy LTE UEs from Camping on eLTE Cells & PLMNs Connected to New 5G Core, 3rd GenerationPartnership Project (3GPP), Mobile Competence Centre ; 650, Route Des Lucio, vol. RAN WG2, No. Reno, USA; Nov. 27, 2017-Dec. 1, 2017, Nov. 16, 2017 (Nov. 16, 2017), XP051370939, 6 Pages,Retrieved from the Internet:URL:http://www.3gpp.org/ftp/tsg%5Fran/WG2%5FRL2/TSGR2%5F100/Docs [retrieved on Nov. 16, 2017].

International Search Report and Written Opinion—PCT/US2019/022089—ISA/EPO—dated May 20, 2019.

Nokia et al., "Optimization of Deployments Using Extended TAC", 3GPP Draft; R3-181142_Tachandling, 3rd Generation Partnership Project (3GPP), Mobile Competence Centre ; 650, Route Des Lucioles ; F-06921 Sophia-Antipolis Cedex; France, vol. RAN WG3, No. Athens, Greece; Feb. 26, 2018-Mar. 2, 2018, Feb. 16, 2018, (Feb. 16, 2018), XP051401581, 5 Pages, Retrieved from the Internet: URL:http://www.3gpp.org/ftp/tsg%5Fran/WG3%5Flu/TSGR3%5F99/Docs/ [retrieved on Feb. 16, 2018], 1 Description.

ZTE: "Consideration on CN Type Indication", 3GPP Draft; R2-1708151 Consideration on CN Type Indication, 3rd Generation Partnership Project (3GPP),Mobile Competence Centre ; 650, Route Des Lucioles ;F-06921 Sophia-Antipolis Cedex ; France, vol. RAN WG2, No. Berlin, Germany; Aug. 21, 2017-Aug. 25, 2017, Aug. 20, 2017, (Aug. 20, 2017), XP051318054, 9 Pages, Retrieved from the Internet:URL:http://www.3gpp.org/ftp/Meetings_3GPP_Sync/RAN2/Docs/ [retrieved on Aug. 20, 2017], Appendix.

\* cited by examiner

```
SystemInformationBlockType1 ::=    SEQUENCE {
    cellAccessRelatedInfo          SEQUENCE {
        plmn-IdentityList,
        trackingAreaCode,
        cellIdentity,
        cellBarred                 ENUMERATED (barred, notBarred),
        intraFreqReselection       ENUMERATED (allowed, notAllowed),
        csg-Indication             BOOLEAN,
        csg-Identity               CSG-Identity            OPTIONAL  -- Need OR
    },
    cellSelectionInfo              SEQUENCE {
        q-RxLevMin,
        q-RxLevMinOffset           INTEGER (1..8)                    OPTIONAL  -- Need OP
    },
    p-Max,
    freqBandIndicator,
    schedulingInfoList,
    tdd-Config,                                                       OPTIONAL  -- Need OP
    si-WindowLength                ENUMERATED {
                                    ms1, ms2, ms5, ms10, ms15, ms20,
                                    ms40},                            -- Cond TDD
    systemInfoValueTag             INTEGER (0..31),
    nonCriticalExtension           SystemInformationBlockType1-v890-IEs OPTIONAL
}
```

FIG. 4

```
SystemInformationBlockType1-v1450-IEs ::=    SEQUENCE {
    tdd-Config-v1450                TDD-Config-v1450            OPTIONAL,  -- Cond TDD-OR
    nonCriticalExtension            SystemInformationBlockType1-v15xy-IEs   OPTIONAL
}

SystemInformationBlockType1-v15xy-IEs ::= {
    -- Following list is for 5GC-only PLMNs and index to 5GC PLMNs also included in
    -- legacy list with same TAC
    cellAccessRelatedInfoList5GC-r15    SEQUENCE (SIZE (1..maxPLMN-1-r14)) OF
                                        CellAccessRelatedInfo-r15    OPTIONAL,  -- Need OR
    -- Following list is to extend legacy PLMN list with 5GC PLMNs belonging to both LTE
    -- and 5G, as well as to keep the legacy procedure in case of all PLMNs connected to 5GC only
    cellAccessRelatedInfoList-r15xy SEQUENCE (SIZE (1..maxPLMN-1-r14)) OF
                                        CellAccessRelatedInfo-r15xy OPTIONAL, -- Need OR
                                                                    OPTIONAL,
    nonCriticalExtension            SEQUENCE {}                     OPTIONAL
}

PLMN-IdentityList ::=           SEQUENCE (SIZE (1..maxPLMN-r11)) OF PLMN-IdentityInfo PLMN-IdentityInfo ::=           SEQUENCE {
    plmn-Identity                   PLMN-Identity,
    cellReservedForOperatorUse      ENUMERATED {reserved, notReserved}
}
```

FIG. 6

```
SystemInformationBlockType1-v1450-IEs ::=   SEQUENCE {
    tdd-Config-v1450            TDD-Config-v1450         OPTIONAL,   -- Cond TDD-OR
    nonCriticalExtension        SystemInformationBlockType1-v15xy-IEs  OPTIONAL
}

SystemInformationBlockType1-v15xy-IEs ::= {
    -- following is one line for SCC PLMNs including SCC-only and index to SCC PLMNs included in
    -- legacy list
    cellAccessRelatedInfoList-SCC-r15    SEQUENCE (SIZE (1..maxPLMN-1-r14)) OF
                                         CellAccessRelatedInfo-r15      OPTIONAL    -- Need OR
    nonCriticalExtension                 SEQUENCE {}                    OPTIONAL
}

PLMN-IdentityList ::=  SEQUENCE (SIZE (1..maxPLMN-r11)) OF PLMN-IdentityInfo

PLMN-IdentityInfo ::=  SEQUENCE {
    plmn-Identity               PLMN-Identity,
    cellReservedForOperatorUse  ENUMERATED {reserved, notReserved}
}
```

FIG. 8

```
CellAccessRelatedInfo-r14 ::=    SEQUENCE (
    plmn-IdentityList-r14           PLMN-IdentityList,
    trackingAreaCode-r14            TrackingAreaCode,
    cellIdentity-r14                CellIdentity
}

CellAccessRelatedInfo-5GC-r15 ::=  SEQUENCE {
    plmn-IdentityList-r15           SEQUENCE (
        plmn-IdentityList-r15           PLMN-IdentityList,
        plmn-Identity-r15               PLMN-Identity-r15       OPTIONAL
    }
    trackingAreaCode-5GC-r15        TrackingAreaCode-r15,
    cellIdentity-5GC-r15            CellIdentity-r15
}

PLMN-IdentityList-r15 ::=  SEQUENCE (SIZE (1..maxPLMN-r14)) OF PLMN-Identity-r15
```

FIG. 9

```
SystemInformationBlockType1-v1450-IEs ::=   SEQUENCE {
    tdd-Config-v1450                    TDD-Config-v1450            OPTIONAL,   -- Cond TDD-OR
    nonCriticalExtension                SystemInformationBlockType1-v15xy-IEs   OPTIONAL
}

SystemInformationBlockType1-v15xy-IEs ::= SEQUENCE {
    -- following list is to extend legacy PLMN identity list(s) with SCG TLC, for PLMNs belonging
    -- to both LTE and 5G, as well as to keep the legacy list non-empty in case of all PLMNs
    -- connected to 5GC only
    cellAccessRelatedInfoList-v15xy     SEQUENCE (SIZE (1..maxPLMN-1-r14)) OF
                                            CellAccessRelatedInfo-r15xy OPTIONAL,   -- Need OR
    -- following corresponds to new list(s) for 5GC-only PLMNs
    cellAccessRelatedInfoList5GC-r15    SEQUENCE (SIZE (1..maxPLMN-1-r14)) OF
                                            CellAccessRelatedInfo5GC-r15 OPTIONAL,  -- Need OR
    nonCriticalExtension                SEQUENCE {}                 OPTIONAL
}
```

FIG. 10

```
CellAccessRelatedInfo-v15xy ::= SEQUENCE {
    trackingAreaCode-5GC-r15        TrackingAreaCode   OPTIONAL,  -- Cond 5GC
    cellIdentity-r15                CellIdentity5GC-r15   OPTIONAL
}

CellAccessRelatedInfo5GC-r15 ::= SEQUENCE {
    plmn-IdentityList5GC-r15        PLMN-IdentityList,
    -- following field is used to indicate 5GC TAC and 5GC Cell ID for the PLMN identities in
    -- the above list, "new" means above list corresponds to 5GC-only PLMNs whose corresponding 5GC TAC
    -- and Cell ID have not been included in legacy list extension for 5GC; "common" means corresponds
    -- 5GC TAC and 5GC Cell ID is common with other 5GC+EPC PLMNs, i.e. whose corresponding 5GC TAC and
    -- Cell ID have been included in legacy list extension for 5GC
    tac-and-CellID-Info-5GC-r15     CHOICE {
        new         SEQUENCE {
            trackingAreaCode-r15    TrackingAreaCode5GC-r15,
            cellIdentity-r15        CellIdentity5GC-r15
        },
        common      plmn-IdentityListIndex-r15  INTEGER (1..maxPLMN-r11)
    }
}
```

FIG. 11

```
RRCConnectionSetupComplete-r8-IEs ::=   SEQUENCE {
    selectedPLMN-Identity                   INTEGER (1..maxPLMN-r11),
    registeredMME                           RegisteredMME                                   OPTIONAL,
    dedicatedInfoNAS                        DedicatedInfoNAS,
    nonCriticalExtension                    RRCConnectionSetupComplete-r8O-IEs  OPTIONAL
}

RRCConnectionSetupComplete-v1430-IEs ::= SEQUENCE {
    dcn-ID-r14                              INTEGER (0..65535)                              OPTIONAL,
    nonCriticalExtension                    RRCConnectionSetupComplete-v15xy-
IEs OPTIONAL
}

RRCConnectionSetupComplete-v15xy-IEs ::= SEQUENCE {
    selectedPLMN-IdentityListType-r15       ENUMERATED {legacy, 5gc}
        OPTIONAL,
    nonCriticalExtension                    SEQUENCE {}                                     OPTIONAL
}
```

FIG. 12

DEVICES AND METHODS FOR FACILITATING OPTIMIZATION OF PUBLIC LAND MOBILITY NETWORK CONFIGURATION FOR A SYSTEM INFORMATION BLOCK

PRIORITY CLAIM

This application claims priority to and the benefit of provisional patent application No. 62/642,981 filed in the United States Patent and Trademark Office on Mar. 14, 2018, as well as priority to and the benefit of provisional patent application No. 62/666,052 filed in the United States Patent and Trademark Office on May 2, 2018, with the entire content of each disclosure incorporated herein by reference as if fully set forth below in its entirety and for all applicable purposes.

TECHNICAL FIELD

The technology discussed below relates generally to wireless communication systems, and more particularly to methods and devices for facilitating optimization of public land mobility network (PLMN) configuration in broadcast signaling in a wireless communication system.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE called New Radio (NR), which may correspond to a fifth generation (5G) network. As it stands today, 5G NR networks may exhibit a higher degree of flexibility and scalability than LTE, and are envisioned to support very diverse sets of requirements. In some instances, it may be desirable that one or more of the improvements obtained in 5G NR be applicable to other multi-access technologies and the telecommunication standards that employ these technologies.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various examples and implementations of the present disclosure facilitate optimization of public land mobility network (PLMN) configuration in broadcast signaling in a wireless communication system. According to at least one aspect of the disclosure wireless communication devices are disclosed. In at least one example, wireless communication devices may include a transceiver, a memory, and a processor coupled to the transceiver and the memory. The processor may be adapted to make a determination for each of a first public land mobile network (PLMN) configuration directed towards PLMNs configured to connect with a first type of core network, and a second PLMN configuration directed towards PLMNs configured to connect with a second type of core network. At least one parameter may be identified having a common identifier between a hybrid PLMN and a different PLMN. Here, the hybrid PLMN can be configured to connect with each of the first type of core network and the second type of core network, and the hybrid PLMN and the different PLMN are listed in different ones of the first PLMN configuration and the second PLMN configuration. An inclusion of the common identifier is then limited to one of the first PLMN configuration or the second PLMN configuration by utilizing at least one index. Each of the first PLMN configuration and the second PLMN configuration are then transmitted to at least one user equipment.

Additional aspects of the present disclosure include methods operational on a wireless communication device and/or means for performing such methods. According to at least one example, such methods may include determining each of a first PLMN configuration and a second PLMN configuration. The first PLMN configuration may be directed towards PLMNs configured to connect with a first type of core network, and the second PLMN configuration may be directed towards PLMNs configured to connect with a second type of core network. At least one parameter may be identified having a common identifier between a hybrid PLMN and a different PLMN, where the hybrid PLMN is configured to connect with each of the first type of core network and the second type of core network, and where the hybrid PLMN and the different PLMN are listed in different ones of the first PLMN configuration and the second PLMN configuration. An inclusion of the common identifier may be limited to one of the first PLMN configuration or the second PLMN configuration by utilizing at least one index. Each of the first PLMN configuration and the second PLMN configuration are then transmitted to at least one user equipment.

Still further aspects of the present disclosure include processor-readable storage mediums storing processor-executable programming. In at least one example, the processor-executable programming may be adapted to make a determination for each of a first PLMN configuration directed towards PLMNs configured to connect with a first type of core network, and a second PLMN configuration directed towards PLMNs configured to connect with a second type of core network. At least one parameter may be identified having a common identifier between a hybrid PLMN and a different PLMN. Here, the hybrid PLMN can be configured to connect with each of the first type of core network and the second type of core network, and the hybrid PLMN and the different PLMN are listed in different ones of the first PLMN configuration and the second PLMN configuration. An inclusion of the common identifier is then limited to one of the first PLMN configuration or the second PLMN configuration by utilizing at least one index. Each of the first PLMN configuration and the second PLMN configuration are then transmitted to at least one user equipment.

According to additional aspects of the present disclosure, wireless communication devices may include a transceiver, a memory, and a processor coupled to the transceiver and the memory. The processor may be adapted to receive via the transceiver each of a first PLMN configuration and a second PLMN configuration. The first PLMN configuration may be directed towards PLMNs configured to connect with a first type of core network, and the second PLMN configuration may be directed towards PLMNs configured to connect with a second type of core network. A hybrid PLMN included in one of the first PLMN configuration or the second PLMN configuration may be selected, where the hybrid PLMN is configured to connect with each of the first type of core network and the second type of core network. A determination may be made whether the hybrid PLMN will be used to connect with the first type of core network or the second type of core network. Whether a parameter associated with the hybrid PLMN was ascertained via the first PLMN configuration or the second PLMN configuration may be reported, such that the reporting facilitates an indication of whether the hybrid PLMN is connected to the first type of core network or the second type of core network.

Additional aspects of the present disclosure include methods operational on a wireless communication device and/or means for performing such methods. According to at least one example, such methods may include receiving each of a first PLMN configuration and a second PLMN configuration. The first PLMN configuration may be directed towards PLMNs configured to connect with a first type of core network, and the second PLMN configuration may be directed towards PLMNs configured to connect with a second type of core network. A hybrid PLMN included in one of the first PLMN configuration or the second PLMN configuration may be selected, where the hybrid PLMN is configured to connect with each of the first type of core network and the second type of core network. A determination may be made whether the hybrid PLMN will be used to connect with the first type of core network or the second type of core network. Whether a parameter associated with the hybrid PLMN was ascertained via the first PLMN configuration or the second PLMN configuration may be reported, such that the reporting facilitates an indication of whether the hybrid PLMN is connected to the first type of core network or the second type of core network.

Still further aspects of the present disclosure include processor-readable storage mediums storing processor-executable programming. In at least one example, the processor-executable programming may be adapted to receive each of a first PLMN configuration and a second PLMN configuration. The first PLMN configuration may be directed towards PLMNs configured to connect with a first type of core network, and the second PLMN configuration may be directed towards PLMNs configured to connect with a second type of core network. A hybrid PLMN included in one of the first PLMN configuration or the second PLMN configuration may be selected, where the hybrid PLMN is configured to connect with each of the first type of core network and the second type of core network. A determination may be made whether the hybrid PLMN will be used to connect with the first type of core network or the second type of core network. Whether a parameter associated with the hybrid PLMN was ascertained via the first PLMN configuration or the second PLMN configuration may be reported, such that the reporting facilitates an indication of whether the hybrid PLMN is connected to the first type of core network or the second type of core network.

Other aspects, features, and embodiments associated with the present disclosure will become apparent to those of ordinary skill in the art upon reviewing the following description in conjunction with the accompanying figures.

BRIEF DESCRIPTION OF THE DRAWINGS

FIG. 4 illustrates an example structure of a system information block in a Long Term Evolution (LTE) network, in accordance with certain aspects of the present disclosure.

FIG. 6 illustrates a first portion of a SIB1 structure for a first implementation in accordance with certain aspects of the present disclosure.

FIG. 8 illustrates a first portion of a SIB1 structure for a second implementation in accordance with certain aspects of the present disclosure.

FIG. 9 illustrates a second portion of a SIB1 structure for the second implementation in accordance with certain aspects of the present disclosure.

FIG. 10 illustrates a first portion of a SIB1 structure for a third implementation in accordance with certain aspects of the present disclosure.

FIG. 11 illustrates a second portion of a SIB1 structure for the third implementation in accordance with certain aspects of the present disclosure.

FIG. 12 illustrates exemplary structure for reporting an index in accordance aspects disclosed herein.

DETAILED DESCRIPTION

Figure 1:
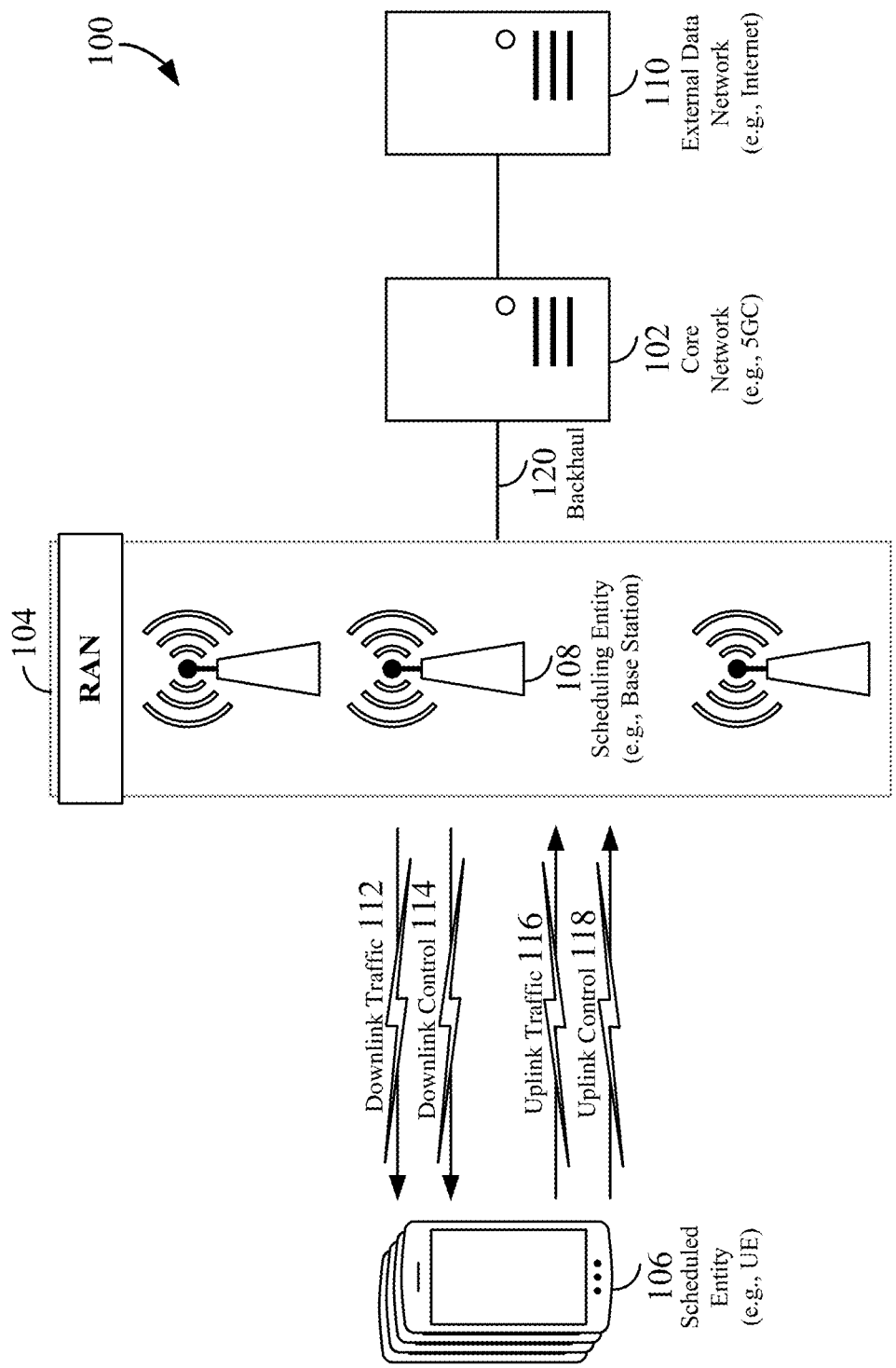
FIG. 1 is a schematic diagram illustrating an example of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, where a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Using aspects presented herein, a base station 108 may determine a first PLMN configuration for PLMNs associated (e.g., solely) with an EPC network and PLMNs associated with an EPC network and 5G core network. The base station 108 may also determine a second PLMN configuration for PLMNs associated (e.g., solely) with a 5G core network. The base station 108 may signal the first and second PLMN configurations to one or more UEs 106. A UE 106 may perform a cell selection procedure in one of the PLMNs from the first and second PLMN configurations using parameter(s) in at least one of the first or second PLMN configurations.

Figure 2:
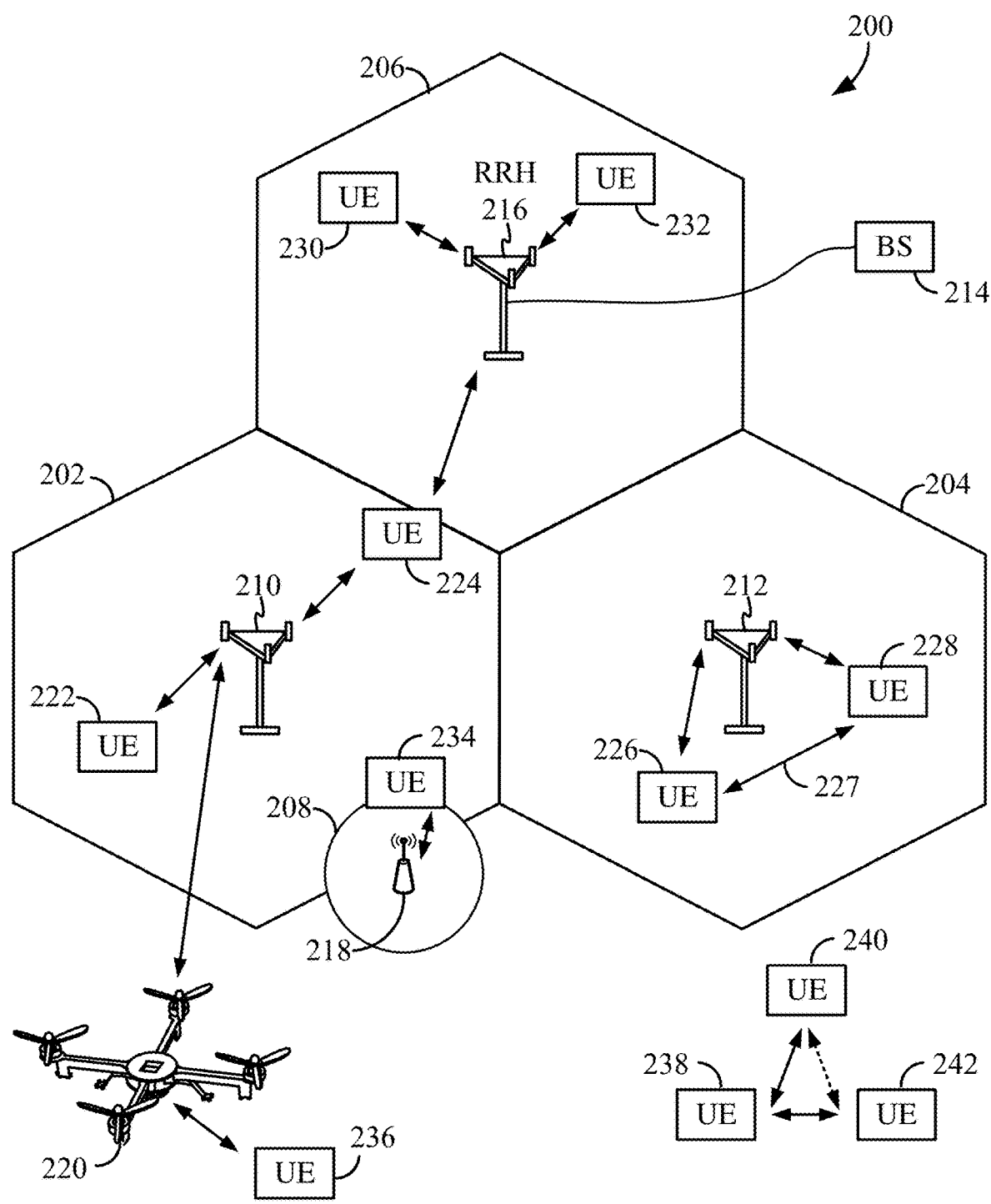
FIG. 2 is a conceptual diagram illustrating an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication. In various aspects of the disclosure, a radio access network 200 may utilize DL-based mobility or UL-based mobility to enable mobility and handovers (i.e., the transfer of a UE's connection from one radio channel to another).

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
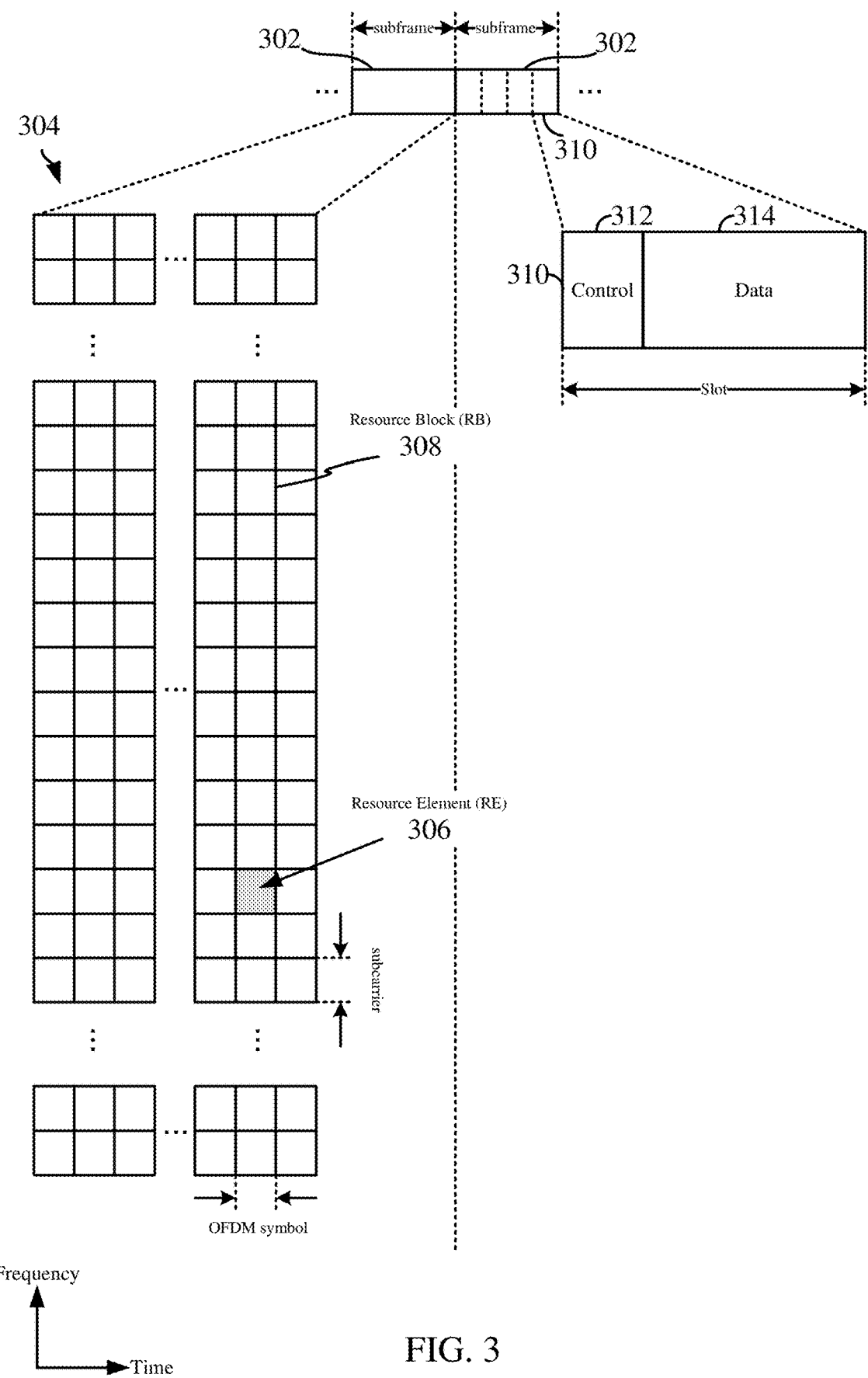
FIG. 3 is a schematic illustration of an organization of wireless resources in an air interface utilizing orthogonal frequency divisional multiplexing (OFDM).

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In NR or 5G system architectures, a PLMN can be connected to multiple core networks. For example, a PLMN can be connected to at least one of a 4G core network (e.g., Evolved Packet Core (EPC) network), or 5G core network (e.g., NR or Next Generation Core Network) or both. In other words, each PLMN can be connected to: (1) an EPC network only, (2) both an EPC network and a 5G core network, or (3) a 5G core network only.

In addition, NR or 5G system architectures may support connectivity to the 5G core network via multiple radio access networks (RANs). In some cases, UEs may connect to the 5G core network via LTE eNBs (e.g., evolved LTE (eLTE) Next Generation (NG)-eNBs) in a LTE RAN. In such cases, an eLTE eNB can provide per PLMN connectivity to EPC networks, 5G core networks, or EPC+5G core networks. In other cases, UEs may connect to the 5G core network via a gNB in a 5G RAN.

In cases where a PLMN associated with an eLTE eNB is connected solely to a 5G core network, it may be desirable to keep UEs that are only capable of a 4G non-access stratum (NAS) connection to the EPC network (and, thus, cannot connect to the 5G core network) from camping on the eLTE cell. To prevent such UEs (e.g., legacy LTE UEs) from camping on an eLTE eNB connected solely to a 5G core network, and accessing a PLMN connected solely to a 5G core network, one or more aspects of the present disclosure may include techniques that prevent legacy UEs from camping on eLTE PLMNs that are not connected to the EPC network. According to at least one embodiment, aspects of the present disclosure facilitate optimizing PLMN configuration in system information blocks (e.g., SIB1) in a manner that may reduce the overhead for such system information blocks for wireless communications.

According to one or more aspects of the present disclosure, NR system architectures may support the use of a PLMN list for 5G core networks in addition to a legacy PLMN list (e.g., for 4G core networks). For example, in cases where all the PLMNs have access to solely the 5G core network, then the UEs capable of only a 4G NAS connection to EPC can be barred from accessing the cells in the PLMNs via a flag (e.g., "cellBarred" flag) in the system information block (e.g., SIB1). On the other hand, UEs capable of a 5G NAS connection to the 5G core network may ignore the flag (e.g., "cellBarred" flag) in the system information block (e.g., SIB1). Further, a flag (e.g., "cellBarred-5GC" flag) may be added to the system information block (e.g., SIB1) to provide the cell barring flag functionality for UEs capable of a 5G NAS connection to the 5G core network.

In some cases, information may be added in the system information (e.g., SIB1) about the available core network(s) associated with each PLMN. For example, a 5G core network PLMN list that includes PLMNs that can connect to the 5G core network may be included in the system information (e.g., SIB1). A 5G core network specific parameter (e.g., "cellReservedForOperatorUse_5GC") may be introduced in SIB1 for PLMNs that can connect to both the EPC network and the 5G core network. The SIB1 may also include a tracking area code (TAC) field for use in 5G core networks. The TAC field for 5G core networks may be separate from the TAC field for EPC networks, e.g., to enable different TAC values for EPC networks and 5G core networks. In some cases, the TAC for 5G core networks may be PLMN specific.

The PLMN information in the system information (e.g., SIB1) may include various parameters that the UE can use for cell selection. Examples of such parameters can include a TAC, cell identity (ID), cellBarred, etc. FIG. 4 illustrates an example of a SIB1 structure used in LTE Release 8 communication systems, in accordance with certain aspects of the present disclosure. As shown in this example, SIB1 may include a set of PLMNs in a PLMN ID list (e.g., "plmn-IdentityList"). Each PLMN in the PLMN ID list may be identified via a PLMN ID that is based in part on a mobile country code (MCC) and mobile network code (MNC). In the example shown in FIG. 4, the legacy TAC (e.g., "trackingAreaCode") and the cell ID (e.g., "cellIdentity") parameters may be common for all PLMNs in the PLMN ID list (e.g., "plmn-IdentityList").

Figure 5:
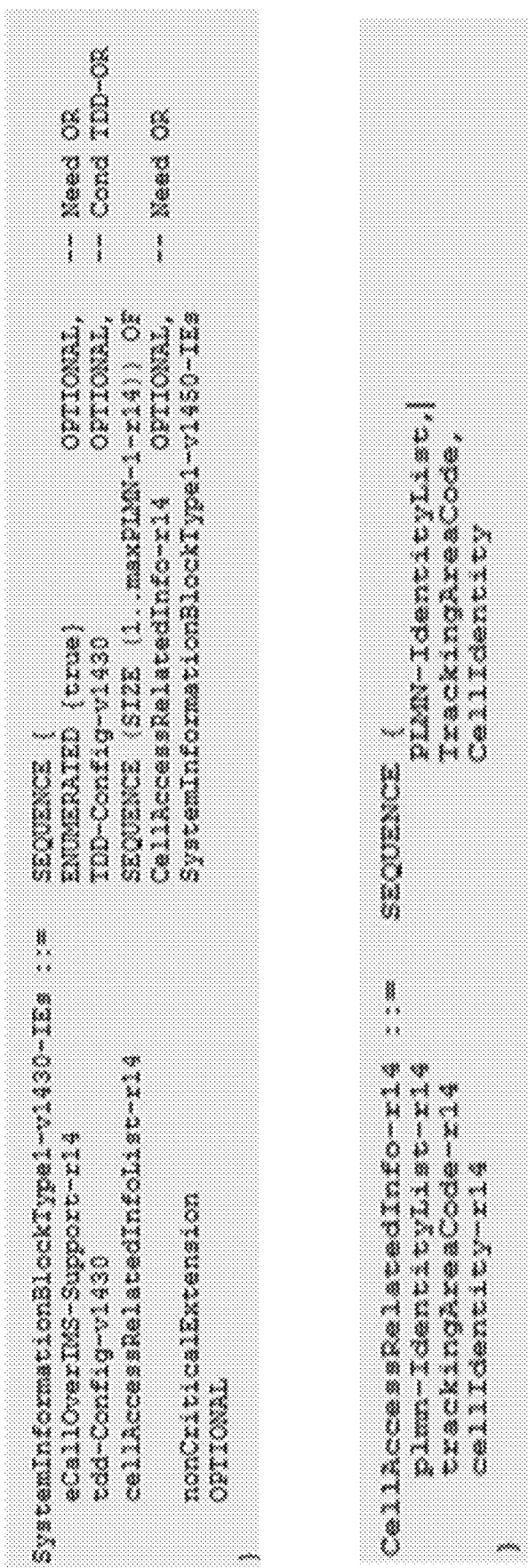
FIG. 5 illustrates another example structure of a system information block in LTE, in accordance with certain aspects of the present disclosure.

FIG. 5 illustrates another example of a SIB1 structure used in LTE Release 14 communication systems, in accordance with certain aspects of the present disclosure. Compared to the SIB1 structure depicted in FIG. 4, the legacy TAC (e.g., "trackingAreaCode") and cell ID (e.g., "cellIdentity") parameters in the SIB1 structure depicted in FIG. 5 are defined for each PLMN in the PLMN ID list (e.g., "plmn-IdentityList") in the SIB1. Although not shown, in the case of a SIB1 structure that includes the additional PLMN information for 5G core networks, the 5G core network TAC and cell ID parameters can also be common for all PLMNs in the PLMN ID list, or the 5G core network TAC and cell ID parameters can be defined per PLMN in the PLMN ID list.

In general, in the case of eLTE eNBs, which can provide PLMN connectivity to solely EPC networks, solely 5G core networks, or both EPC networks and 5G core networks, it is possible to have (1) a same TAC and same cell ID for PLMNs in EPC networks and/or 5G core networks, (2) a different TAC and different cell ID for PLMNs in EPC networks and/or 5G core networks, (3) a different TAC and same cell ID for PLMNs in EPC networks and/or 5G core networks, or (4) a same TAC and different cell ID for PLMNs in EPC networks and/or 5G core networks.

However, given the different possible parameter configurations for PLMNs, there may be some situations in which the additional PLMN information for 5G core networks includes redundant information, e.g., information already provided in the legacy PLMN lists. This can significantly increase the size of the system information block (e.g., SIB1), impacting signaling overhead communications in the network. Accordingly, it may be desirable to provide techniques for optimizing the configuration of PLMNs in SIB1 to minimize the system information block (e.g., SIB1) overhead.

According to various aspects of the present disclosure, a base station may identify a plurality of PLMNs available for connecting to one or more core networks. The base station may identify the PLMNs based on signaling received from the core network, another base station, a predefined configuration, etc. The base station may determine a first PLMN configuration for a first set of the plurality of PLMNs associated with a first type of core network (e.g., EPC network) and a second set of the plurality of PLMNs (e.g., hybrid PLMN) associated with the first type of core network and a second type of core network (e.g., 5G core network).

The base station may further determine a second PLMN configuration for a third set of the plurality of PLMNs associated with the second type of core network and not the first type of core network. The base station may subsequently signal the first PLMN configuration and the second PLMN configuration to one or more UEs, e.g., via a SIB, such as SIB1.

Similarly, a UE may receive a first PLMN configuration for a first set of PLMNs associated with a first type of core network (e.g., EPC network) and a second set of PLMNs associated with the first type of core network and a second type of core network (e.g., 5G core network). The UE may receive a second PLMN configuration for a third set of PLMNs associated with the second type of core network and not the first type of core network.

The UE may select a PLMN from the first PLMN configuration and the second PLMN configuration. The UE may further perform a cell selection procedure in the selected PLMN based on a set of parameters in at least one of the first PLMN configuration or the second PLMN configuration.

In certain aspects of the present disclosure, techniques may configure the first PLMN configuration (e.g., legacy PLMN list) with EPC network only PLMNs and EPC+5G core network PLMNs, and configure the second PLMN configuration with solely 5G core network PLMNs. However, the base station may refrain from repeating the EPC+5G core network connected PLMNs (and associated parameters) in both the first PLMN configuration and the second PLMN configuration. Such separation may not impact operation between legacy UEs and eLTE UEs. Legacy UEs, for example, may not be able to read/decode the second PLMN configuration information in the system information block (e.g., SIB1), whereas eLTE UEs may be able to read/decode the second PLMN configuration information and the first PLMN configuration information.

In some aspects of the present disclosure, the first PLMN configuration and the second PLMN configuration may include parameters that are common (or the same) for all PLMNs (associated with a particular core network type) in the first and second PLMN configurations. For example, the first PLMN configuration may include a same TAC (e.g., first parameter) and a same cell ID (e.g., second parameter) for PLMNs in the first set and the second set that are associated with the first type of core network (e.g., EPC network). Similarly, the first PLMN configuration and the second PLMN configuration may include a same TAC and a same cell ID for PLMNs in the second set and the third set that are associated with the second type of core network (e.g., 5G core network).

By way of an example and not limitation, a particular implementation may include available PLMNs including PLMNs 1-6. To illustrate various aspects of the present disclosure, we will assume that PLMNs 1-2 are connected solely to the EPC network, PLMNs 3-4 are connected solely to the 5G core network, and PLMNs 5-6 are connected to both the EPC network and 5G core network. According to one or more aspects of the dislcosure, the legacy TAC (e.g., "trackingAreaCode") and cell ID (e.g., "cellIdentity") parameters associated with EPC may be common for all EPC PLMNs 1, 2, 5 and 6. Similarly, the TAC (e.g., "trackingAreaCode_5GC") and cell ID (e.g., "cellIdentity_5GC") parameters associated with the 5G core network may be common for all 5G core network PLMNs 3, 4, 5 and 6.

In some aspects, the first PLMN configuration and the second PLMN configuration may include parameters that are separately defined for each PLMN associated with a particular core network type in the first PLMN configuration and the second PLMN configuration. That is, the first PLMN configuration may include a separate TAC and separate cell ID for each PLMN in the first set and the second set that is associated with the first type of core network (e.g., EPC network). Similarly, the first PLMN configuration and the second PLMN configuration may include a separate TAC and a separate cell ID for each PLMN in the second set and the third set that is associated with the second type of core network (e.g., 5G core network).

For example, there may be three PLMNs, PLMN A, PLMN B, and PLMN C, where PLMN A may be connected to both the EPC network and the 5G core network, PLMN B may be connected solely to the EPC network, and PLMN C may be connected solely to the 5G core network. According to one or more aspects of the present disclosure, the system information block (e.g., SIB1) may include the following set of parameters for PLMN A: "trackingAreaCode_A," "cellIdentity_A," "trackingAreaCode_5GC_A" and "cellIdentity_5GC_A." The system information block (e.g., SIB1) may include the following set of parameters for PLMN B: "trackingAreaCode_B" and "cellIdentity_B." The system information block (e.g., SIB1) may include the following set of parameters for PLMN C: "trackingAreaCode_5GC_C" and "cellIdentity_5GC_C."

In situations in which the parameters are separately defined for each PLMN, a value of at least one of the parameters may be different from a value of at least another of the parameters. For example, as described above, a first PLMN may have a same TAC and same cell ID as a second PLMN (in EPC and/or 5G core network), a first PLMN may have a different TAC and different cell ID as a second PLMN (in EPC and/or 5G core network), a first PLMN may have a different TAC and same cell ID as a second PLMN (in EPC and/or 5G core network), or a first PLMN may have a same TAC and different cell ID as a second PLMN (in EPC and/or 5G core network).

In certain aspects, the first PLMN configuration and the second PLMN configuration may also indicate, for each PLMN, the core network connectivity type (e.g., whether the PLMN supports solely EPC network connectivity, solely 5G core network connectivity, or EPC network and 5G core network connectivity). In some aspects, eLTE UEs may be configured to read this core network connectivity type information in the system information (e.g., SIB1), and legacy UEs may not be able to read such information.

The core network type per PLMN can be explicitly specified or implicitly specified. For example, if the TAC and/or cell ID is common for all PLMNs, an explicit core network type indicator may be included in the system information (e.g., SIB1), to indicate in some examples whether the PLMN is connected to at least one of the EPC network or the 5G core network. On the other hand, if the TAC and/or the cell ID is separately defined for each PLMN, the core network type may be implicitly indicated from the separate TAC and separate cell ID associated with the given PLMN.

For example, referring to the above scenario, a UE may determine that PLMN A is associated with the EPC network and the 5G core network in response to receiving system information (e.g., SIB1) including parameters "trackingAreaCode_A," "cellIdentity_A," "trackingAreaCode_5GC_A" and "cellIdentity_5GC_A" defined for PLMN A. Similarly, a UE may determine that PLMN B is associated solely with the EPC network in response to receiving system information (e.g., SIB1) including legacy parameters "trackingAreaCode_B" and "cellIdentity_B" defined for PLMN B. Further, a UE may determine that PLMN C is associated solely with the 5G core network in response to receiving system information (e.g., SIB1) including parameters "trackingAreaCode_5GC_C" and "cellIdentity_5GC_C" defined for PLMN C.

Once the UE receives the modified SIB1 structure with the optimized PLMN configuration, the UE may select a PLMN and attempt to perform a cell selection procedure in the selected PLMN.

In some aspects, assuming common parameters are defined for all PLMNs associated with a particular type of core network, eLTE UEs and LTE UEs that select a PLMN connected solely to the EPC network may refer to the common legacy TAC and cell ID parameters (e.g., "trackingAreaCode" and "cellIdentity"). eLTE UEs and LTE UEs that select a PLMN connected solely to the 5G core network may refer to the common 5G core network TAC and cell ID parameters (e.g., "trackingAreaCode_5GC" and "cellIdentity_5GC"). For PLMNs connected to both the 5G core network and the EPC network, eLTE UEs and LTE UEs may use the common 5G core network TAC and cell ID parameters (e.g., "trackingAreaCode_5GC" and "cellIdentity_5GC") for 5G core network connectivity, and may use the common legacy TAC and cell ID parameters (e.g., "trackingAreaCode" and "cellIdentity") for EPC network connectivity.

If there is no configured 5G core network TAC and cell ID parameters (e.g., "trackingAreaCode_5GC" and "cellIdentity_5GC") in the system information block (e.g., SIB1), all PLMNs of both PLMN configurations may use the common legacy TAC and cell ID parameters (e.g., "trackingAreaCode" and "cellIdentity"). As noted above, legacy LTE UEs may be able to read only the legacy TAC and cell ID parameters, whereas eLTE UEs may be able to read both legacy and 5G core network TAC and cell ID parameters.

In some aspects, assuming separate parameters are defined for each PLMN, eLTE UEs and LTE UEs that select a PLMN connected solely to the EPC network may refer to the legacy TAC and cell ID parameters (e.g., "trackingAreaCode" and "cellIdentity") separately defined for that selected PLMN. eLTE UEs and LTE UEs that select a PLMN connected solely to the 5G core network may refer to the 5G core network TAC and cell ID parameters (e.g., "trackingAreaCode_5GC" and "cellIdentity_5GC") separately defined for that selected PLMN. For PLMNs connected to both the 5G core network and the EPC network, eLTE UEs and LTE UEs may use the 5G core network TAC and cell ID parameters (e.g., "trackingAreaCode_5GC" and "cellIdentity_5GC") separately defined for that selected PLMN for 5G core network connectivity, and may use the legacy TAC and cell ID parameters (e.g., "trackingAreaCode" and "cellIdentity") separately defined for that selected PLMN for EPC network connectivity.

If there is no configured 5G core network TAC and cell ID parameters (e.g., "trackingAreaCode_5GC" and "cellIdentity_5GC") in the system information block (e.g., SIB1), all PLMNs of both PLMN configurations may use the legacy TAC and cell ID parameters (e.g., "trackingAreaCode" and "cellIdentity") separately defined for that selected PLMN. As noted above, legacy LTE UEs may be able to read only the legacy TAC and cell ID parameters, whereas eLTE UEs may be able to read both legacy and 5G TAC and cell ID parameters.

In another aspect of the disclosure, it is contemplated that the aforementioned techniques may be further optimized. For instance, assume, that the available PLMNs include five PLMNs A-E. Further assume that the TAC and optionally Cell ID are defined for each of PLMNs A-E per PLMN ID and specified for each CN Type according to the following:

PLMN A Connected to EPC only {trackingAreaCode_1, cellIdentity_1}

PLMN B Connected to both EPC and 5GC {trackingAreaCode_2, cellIdentity_2, trackingAreaCode_5GC_1, cellIdentity_5GC_1}

PLMN C Connected to 5GC only {trackingAreaCode_5GC_2, cellIdentity_5GC_2}

PLMN D Connected to 5GC only {trackingAreaCode_5GC_1, cellIdentity_5GC_1} Note the commonality in 5GC TAC and cell ID with PLMN B PLMN E Connected to both EPC and 5GC {trackingAreaCode_3, cellIdentity_3, trackingAreaCode_5GC_3, cellIdentity_5GC_3}

Here, if the aforementioned optimization technique were applied, the system information signaling (e.g., SIB1 signaling) would include having both the EPC Only PLMN Identity list(s) and EPC+5GC PLMN Identity list(s) included in the Legacy PLMN list(s), whereas the 5GC only PLMN Identity list(s) would be included in the new 5GC PLMN list(s). Moreover, it is noted that there is no need to repeat EPC+5GC connected PLMN(s) Identity in both list(s). In this scenario, however, it is problematic to simultaneously keep PLMN B (Connected to both EPC+5GC) only in the Legacy PLMN list(s) while keeping PLMN D (Connected to 5GC only) in the new 5GC PLMN list(s). Namely, in this scenario, it is not possible to specify a common TAC and Cell ID for both PLMN B and PLMN D (i.e., trackingAreaCode_5GC_1, cellIdentity_5GC_1), since the PLMN IDs of these PLMNs are kept in different lists.

Accordingly, aspects disclosed herein include enhanced solutions to overcome the optimization issue above. In a particular aspect, it is proposed that EPC only PLMNs be included in Legacy PLMN list(s), 5GC only PLMNs be included in the new 5GC PLMN list(s), EPC+5GC PLMNs be included in either Legacy PLMN list(s) or 5GC PLMN list(s) depending on whether there is a common 5GC TAC and optionally 5GC Cell ID, and that 5GC TAC Extensions be allowed even for Legacy PLMN Identity List(s).

In a first enhanced solution implementation disclosed herein, the aforementioned scenario of PLMNs A-E is assumed, where EPC+5GC PLMN(s) are kept in Legacy PLMN list(s) with a 5GC TAC Extension, and where 5GC-only PLMN(s) are kept in 5GC PLMN list(s). Namely, each of PLMNs A-E in this exemplary scenario may be listed as follows:

Legacy PLMN Lists:
Legacy_List1: PLMN Identity A with {trackingArea-Code_1, cellIdentity_1}, corresponding 5GC extension list empty.
Legacy_List2: PLMN Identity B with {trackingArea-Code_2, cellIdentity_2}, corresponding 5GC extension list empty. (Note: Its 5G TAC, Cell ID is specified through the Index in 5GC list below)
Legacy_List3: PLMN Identity E with {trackingArea-Code_3, cellIdentity_3}, corresponding 5GC extension list indicate {trackingAreaCode_5GC_3, cellIdentity_5GC_3}
New 5GC PLMN Lists:
5GC_List1: PLMN Identity C with {trackingAreaCode_5GC_2, cellIdentity_5GC_2}
5GC_List2: (PLMN Identity D+PLMN Index Indicating PLMN ID B)=>{trackingAreaCode_5GC_1, cellIdentity_5GC_1}

Here, it is contemplated that the disclosed PLMN Index in the 5GC PLMN List(s) indicates the identification of the legacy list PLMN which corresponds to the 5GC TAC and 5GC Cell ID common to the PLMN(s) in this 5GC_List. This avoids repeating associated 5G TAC ID & 5G Cell ID in both lists to save on the size of the system information block (e.g., SIB1). The system information block (e.g., SIB1) overhead is reduced even further if there are more PLMNs connected to both the EPC and 5GC having common 5G TACs/Cell IDs.

Figure 7:
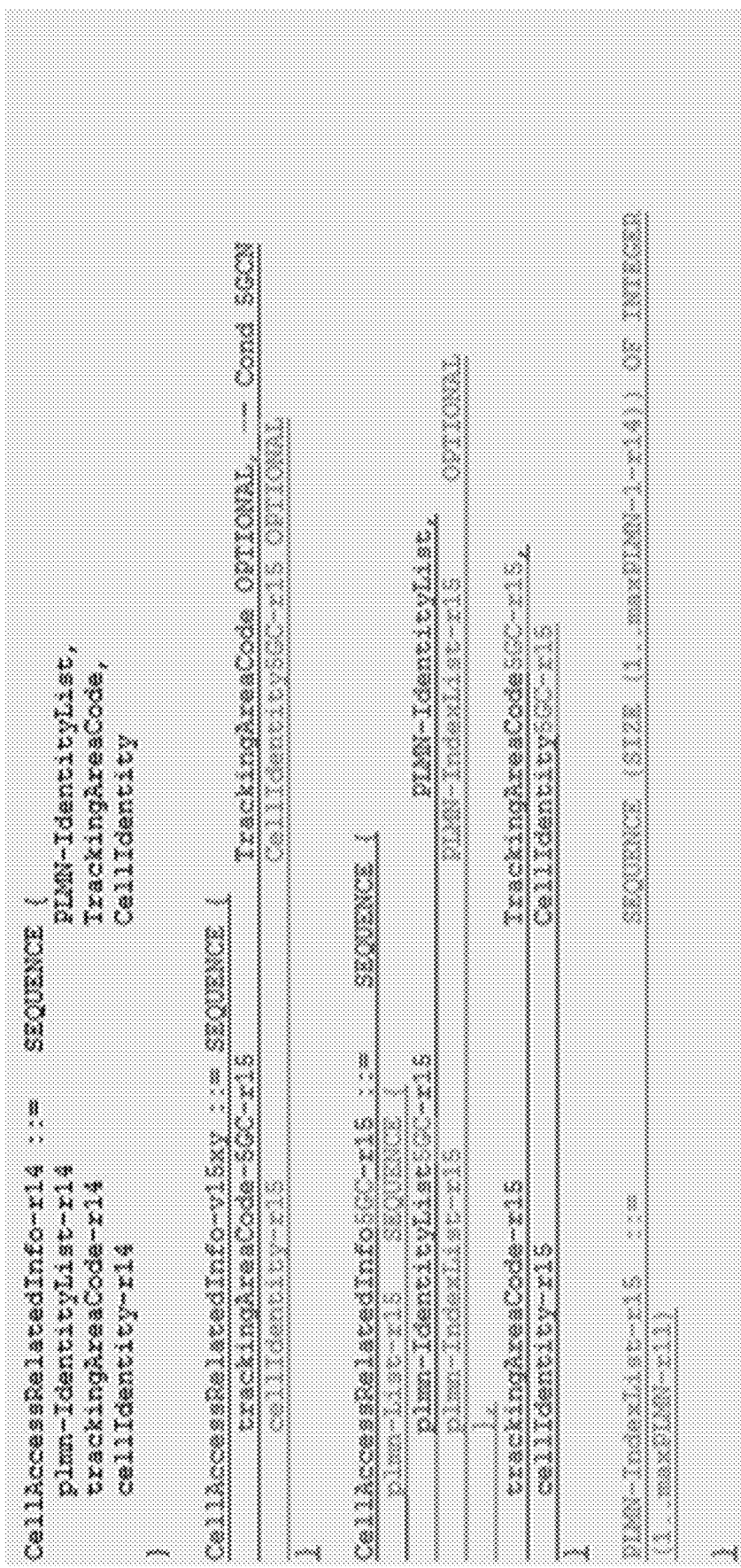
FIG. 7 illustrates a second portion of a SIB1 structure for the first implementation in accordance with certain aspects of the present disclosure.

FIGS. 6 and 7 illustrates non-limiting examples of portions of a SIB1 structure for this first implementation in accordance with certain aspects of the present disclosure. As used in this particular implementation, it should be appreciated that plmn-IndexList refers to an index list corresponding to PLMN identities listed in plmn-IdentityList. Index 1 corresponds to the 1st PLMN from the 1st plmn-IdentityList included in SIB1, index 2 corresponds to the 2nd PLMN from the same plmn-IdentityList, or when no more PLMNs are present within the same plmn-IdentityList, then the PLMN listed 1st in the subsequent plmn-IdentityList within the same SIB1 and so on. Here, it is noted that it may be desirable to define a dummy (or placeholder, wherein "placeholder" and "dummy" are interchangeable herein) TAC value to be used when all PLMNs are 5GC-only, for backward compatibility (e.g., to ensure the legacy list is not empty). If a new 5GC cell ID is defined, it may also be desirable to define a dummy LTE cell ID value to be used when all PLMNs are 5GC-only, for backward compatibility (e.g., to ensure the legacy list is not empty).

There are several advantages of allowing 5GC TAC extensions for Legacy PLMN Identity list(s). For instance, a PLMN that is connected to both EPC+5GC, but does not have common a 5GC TAC with any 5GC-Only PLMN in a 5GC List(s), can remain in a Legacy PLMN Identity list(s). Also, when all PLMNs are connected to 5GC Only, all 5GC-Only PLMNs can be simply specified in the Legacy PLMN Identity list(s), which may be needed because Legacy PLMN list(s) are not allowed to be empty (i.e., there needs to be at least one such list with at least one PLMN ID) based on the existing Rel-14 SIB1 ASN.1 coding structure. Another contemplated advantage is that, if PLMN(s) connected to 5GC only are specified in Legacy PLMN list(s), then this may require a dummy 4G/LTE TAC to be configured and to be specified as a dummy, which may be desirable to prevent Rel-15 eLTE UE from not interpreting the dummy 4GC TAC as a valid one.

In a second enhanced solution implementation disclosed herein, the aforementioned scenario of PLMNs A-E is again assumed, wherein 5GC-only PLMN(s) and EPC+5GC PLMN(s) are kept in 5GC PLMN list(s), and no 5GC TAC Extensions are included in Legacy PLMN list(s). Namely, each of PLMNs A-E in this exemplary scenario may be listed as follows:

Legacy PLMN Lists:
Legacy_List1: PLMN Identity A with {trackingArea-Code_1, cellIdentity_1}
Legacy_List2: PLMN Identity B with {trackingArea-Code_2, cellIdentity_2}
Legacy_List3: PLMN Identity E with {trackingArea-Code_3, cellIdentity_3}
New 5GC PLMN Lists:
5GC_List1: PLMN Identity C with {trackingAreaCode_5GC_2, cellIdentity_5GC_2}
5GC_List2: (PLMN Identity D and PLMN Index of PLMN B) with {trackingAreaCode_5GC_1, cellIdentity_5GC_1}
5GC_List3: (PLMN Index of PLMN E) with {trackingAreaCode_5GC_3, cellIdentity_5GC_3}

Here, it is contemplated that the disclosed PLMN Index in the 5GC PLMN List(s) is used to point to a specific PLMN ID in the Legacy PLMN list(s), which avoids repeating a 24-bit PLMN ID and associated 5GC TAC ID & Cell ID in both lists to thus save SIB1 size. Thus, associated 5G TAC ID & 5G Cell ID need not be repeated in both lists to save on SIB1 size. To avoid keeping legacy PLMN list(s) empty when all PLMN(s) are connected to 5GC only, it is contemplated to allow for a dummy PLMN ID, dummy 4G TAC, and/or dummy 4G Cell ID to be configured in a legacy PLMN list when all PLMN(s) are connected to 5GC only.

FIGS. 8 and 9 illustrates non-limiting examples of portions of a SIB1 structure for this second implementation in accordance with certain aspects of the present disclosure. As depicted in this particular implementation, it should be appreciated that plmn-IndexList refers to an index list corresponding to PLMN identities listed in plmn-IdentityList. Index 1 corresponds to the 1st PLMN from the 1st plmn-IdentityList included in SIB1, index 2 corresponds to the 2nd PLMN from the same plmn-IdentityList, or when no more PLMNs are present within the same plmn-IdentityList, then the PLMN listed 1st in the subsequent plmn-IdentityList within the same SIB1 and so on. Here, it is again noted that it may be desirable to define a dummy PLMN and TAC value to be used when all PLMNs are 5GC-only, for backward compatibility (e.g., to ensure the legacy list is not empty). If a new 5GC cell ID is defined, it may also be desirable to define a dummy LTE cell ID value to be used when all PLMNs are 5GC-only, for backward compatibility (e.g., to ensure the legacy list is not empty).

A brief comparison of the first and second implementations shows that the second implementation might be more desirable in some circumstances. For instance, in case all PLMNs are connected to 5GC only, the first implementation may need multiple dummy 4G TAC, 4G Cell ID, whereas the second implementation only needs one set of such dummy values.

In a third enhanced solution implementation disclosed herein, the aforementioned scenario of PLMNs A-E is again assumed, where EPC+5GC PLMN(s) are kept in Legacy PLMN list(s) with a 5GC TAC Extension, and where 5GC-only PLMN(s) are kept in 5GC PLMN list(s). Namely, each of PLMNs A-E in this exemplary scenario may be listed as follows:

Legacy PLMN Lists:
Legacy_List1: PLMN Identity A with {trackingAreaCode_1, cellIdentity_1}, corresponding 5GC extension list empty.
Legacy_List2: PLMN Identity B with {trackingAreaCode_2, cellIdentity_2}, corresponding 5GC extension list indicate {trackingAreaCode_5GC_1, cellIdentity_5GC_1}
Legacy_List3: PLMN Identity E with {trackingAreaCode_3, cellIdentity_3}, corresponding 5GC extension list indicate {trackingAreaCode_5GC_3, cellIdentity_5GC_3}
New 5GC PLMN Lists:
5GC_List 1: PLMN Identity C with {trackingAreaCode_5GC_2, cellIdentity_5GC_2}
5GC_List2: PLMN Identity D indicating List Index of Legacy_List2.
5GC_List3: PLMN Identity E indicating List Index of Legacy_List3.

In this example, it is contemplated that the disclosed List Index in the 5GC PLMN List(s) indicates the identification of the legacy list which corresponds to the 5GC TAC and 5GC Cell ID common to the PLMN(s) in this 5GC_List. This avoids repeating associated 5G TAC ID & 5G Cell ID in both lists to save on SIB1 size. SIB1 overhead is reduced even further if there are more PLMNs connected to both the EPC and 5GC having common 5G TACs/Cell IDs.

FIGS. 10 and 11 illustrates non-limiting examples of portions of a SIB1 structure for this third implementation in accordance with certain aspects of the present disclosure. As used in this particular implementation, it should be appreciated that plmn-IndexListIndex refers to an index of the PLMN Identity List included in plmn-IdentityList. Index 1 corresponds to the 1st plmn-IdentityList included in SIB1, index 2 corresponds to the 2nd plmn-IdentityList within the same SIB1 and so on. Here, it is again noted that it may be desirable to define a dummy TAC value to be used when all PLMNs are 5GC-only, for backward compatibility (ie.g., to ensure the legacy list is not empty). If a new 5GC cell ID is defined, it may also be desirable to define a dummy LTE cell ID value to be used when all PLMNs are 5GC-only, for backward compatibility (e.g., to ensure the legacy list is not empty).

A brief comparison of the second and third implementations shows that the second implementation might be more desirable in some circumstances. For instance, in case all PLMNs are connected to 5GC only, the third implementation may need multiple dummy PLMN IDs, 4G TAC, 4G Cell ID, whereas the second implementation only needs one set of such dummy values. The second implementation also saves on PLMN ID as well as associated 5GC TAC and Cell ID, whereas the third implementation only saves 5GC TAC and Cell ID.

Aspects of the present disclosure also include reporting the PLMN Index of the selected PLMN ID during Radio Resource Control (RRC) Connection Setup Signaling (e.g., in Msg 5), where selectedPLMN-Identity is a mandatory field. For instance, when reporting under the first or third implementations, at least a first and second solution is contemplated. In the first solution, since Rel-15 eLTE UE can continue to use the mandatory selectedPLMN-Identity, the parameter "selectedPLMN-Identity" may be updated and/or extended to include the PLMN ID index such that the index N corresponds to Nth entry including both the legacy and new PLMN ID list(s).

In the second proposed solution, a new "selectedPLMN-IdentityListType" parameter may be introduced to specify which PLMN List is used by the UE to select a PLMN ID, where selectedPLMN-Identity may then be used to indicate the index. Exemplary structure for portions of this second solution are depicted in FIG. 12, where a value "legacy" corresponds to plmn-IdentityList fields included in SIB1, and where a value 5gc corresponds to plmn-IdentityList5GC fields included in SIB1. Here, it should also be noted that a new CN Type Indication introduced in Msg 5 may not be sufficient to specify which PLMN list is used, since 5GC PLMNs can be selected either from legacy or new 5GC PLMN list(s).

When reporting under the second implementation, the legacy selectedPLMN-Identity may be used for identifying PLMN ID from the new 5GC PLMN List. Here, however, it should be noted that the new CN Type Indication introduced in Msg 5 can be used to specify the new 5GC PLMN list used by UE for 5GC PLMN selection.

Figure 13:
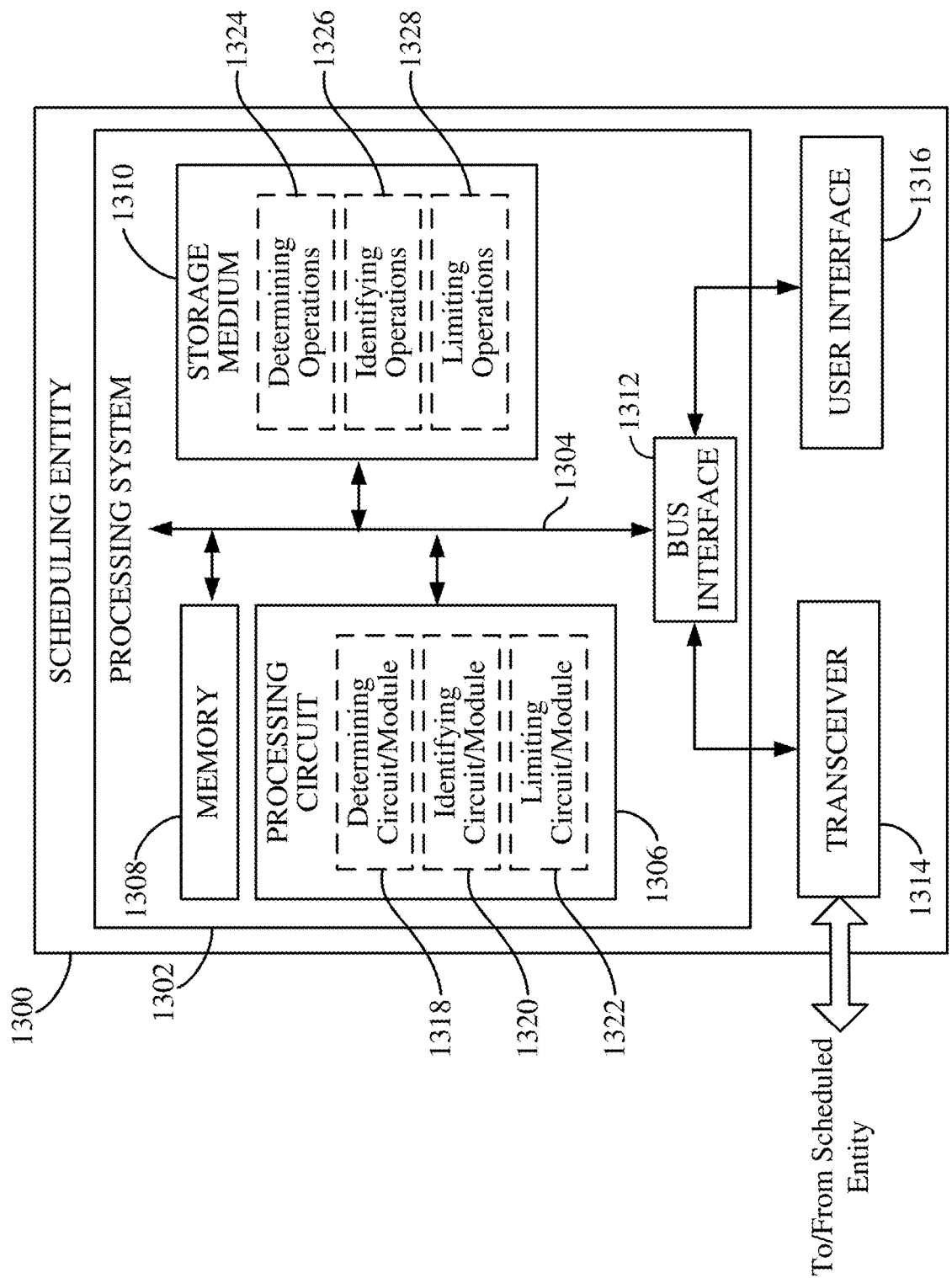
FIG. 13 is a block diagram illustrating select components of a scheduling entity employing a processing system according to at least one example of the present disclosure.

FIG. 13 is a block diagram illustrating select components of a scheduling entity 1300 employing a processing system 1302 according to at least one example of the present disclosure. In this example, the processing system 1302 is implemented with a bus architecture, represented generally by the bus 1304. The bus 1304 may include any number of interconnecting buses and bridges depending on the specific application of the processing system 1302 and the overall design constraints. The bus 1304 communicatively couples together various circuits including one or more processors (represented generally by the processing circuit 1306), a memory 1308, and computer-readable media (represented generally by the storage medium 1310). The bus 1304 may also link various other circuits such as timing sources, peripherals, voltage regulators, and power management circuits, which are well known in the art, and therefore, will not be described any further. A bus interface 1312 provides an interface between the bus 1304 and a transceiver 1314. The transceiver 1314 provides a means for communicating with various other apparatus over a transmission medium. Depending upon the nature of the apparatus, a user interface 1316 (e.g., keypad, display, speaker, microphone, joystick) may also be provided.

The processing circuit 1306 is responsible for managing the bus 1304 and general processing, including the execution of programming stored on the computer-readable storage medium 1310. The programming, when executed by the processing circuit 1306, causes the processing system 1302 to perform the various functions described below for any particular apparatus. The computer-readable storage medium 1310 and the memory 1308 may also be used for storing data that is manipulated by the processing circuit 1306 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1306 is arranged to obtain, process and/or send data, control data access and storage, issue commands, and control other desired operations. The processing circuit 1306 may include circuitry adapted to implement desired programming provided by appropriate media, and/or circuitry adapted to perform one or more functions described in this disclosure. For example, the processing circuit 1306 may be implemented as one or more processors, one or more controllers, and/or other structure configured to execute executable programming and/or execute specific functions. Examples of the processing circuit 1306 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1306 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1306 are for illustration and other suitable configurations within the scope of the present disclosure are also contemplated.

In some instances, the processing circuit 1306 may include a determining circuit and/or module 1318, an identifying circuit and/or module 1320, and a limiting circuit and/or module 1322. The determining circuit/module 1318 may generally include circuitry and/or programming (e.g., programming stored on the storage medium 1310) adapted to determine each of a first PLMN configuration and a second PLMN configuration, as described herein. Here, it is contemplated that the first PLMN configuration is directed towards PLMNs configured to connect with a first type of core network, and that the second PLMN configuration is directed towards PLMNs configured to connect with a second type of core network. The identifying circuit/module 1320 may generally include circuitry and/or programming (e.g., programming stored on the storage medium 1310) adapted to identify at least one parameter having a common identifier between a hybrid PLMN and a different PLMN (e.g., a common tracking area code (TAC)), as described herein. Here, it is contemplated that the hybrid PLMN is configured to connect with each of the first type of core network and the second type of core network, and that the hybrid PLMN and the different PLMN are listed in different ones of the first PLMN configuration and the second PLMN configuration. The limiting circuit/module 1322 may generally include circuitry and/or programming (e.g., programming stored on the storage medium 1310) adapted to limit an inclusion of the common identifier to one of the first PLMN configuration or the second PLMN configuration by utilizing at least one index, as described herein. As used herein, reference to circuitry and/or programming may be generally referred to as logic (e.g., logic gates and/or data structure logic).

The storage medium 1310 may represent one or more computer-readable devices for storing programming, such as processor executable code or instructions (e.g., software, firmware), electronic data, databases, or other digital information. The storage medium 1310 may also be used for storing data that is manipulated by the processing circuit 1306 when executing programming. The storage medium 1310 may be any available non-transitory media that can be accessed by a general purpose or special purpose processor, including portable or fixed storage devices, optical storage devices, and various other mediums capable of storing, containing and/or carrying programming By way of example and not limitation, the storage medium 1310 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 1310 may be coupled to the processing circuit 1306 such that the processing circuit 1306 can read information from, and write information to, the storage medium 1310. That is, the storage medium 1310 can be coupled to the processing circuit 1306 so that the storage medium 1310 is at least accessible by the processing circuit 1306, including examples where the storage medium 1310 is integral to the processing circuit 1306 and/or examples where the storage medium 1310 is separate from the processing circuit 1306 (e.g., resident in the processing system 1302, external to the processing system 1302, distributed across multiple entities).

Programming stored by the storage medium 1310, when executed by the processing circuit 1306, can cause the processing circuit 1306 to perform one or more of the various functions and/or process steps described herein. In at least some examples, the storage medium 1310 may include determining operations 1324, identifying operations 1326, and/or limiting operations 1328. The determining operations 1324 are generally adapted to cause the processing circuit 1306 to determine each of a first PLMN configuration and a second PLMN configuration, as described herein. The identifying operations 1326 are generally adapted to cause the processing circuit 1306 to identify at least one parameter having a common identifier between a hybrid PLMN and a different PLMN (e.g., a common tracking area code (TAC)), as described herein. The limiting operations 1328 are generally adapted to cause the processing circuit 1306 to limit an inclusion of the common identifier to one of the first PLMN configuration or the second PLMN configuration by utilizing at least one index, as described herein.

Thus, according to one or more aspects of the present disclosure, the processing circuit 1306 is adapted to perform (independently or in conjunction with the storage medium 1310) any or all of the processes, functions, steps and/or routines for any or all of the scheduling entities described herein (e.g., base station 210, 212, 214, 218, UE 238, quadcopter 220, scheduling entity 108, 1300). As used herein, the term "adapted" in relation to the processing circuit 1306 may refer to the processing circuit 1306 being one or more of configured, employed, implemented, and/or programmed (in conjunction with the storage medium 1310) to perform a particular process, function, step and/or routine according to various features described herein.

Figure 14:
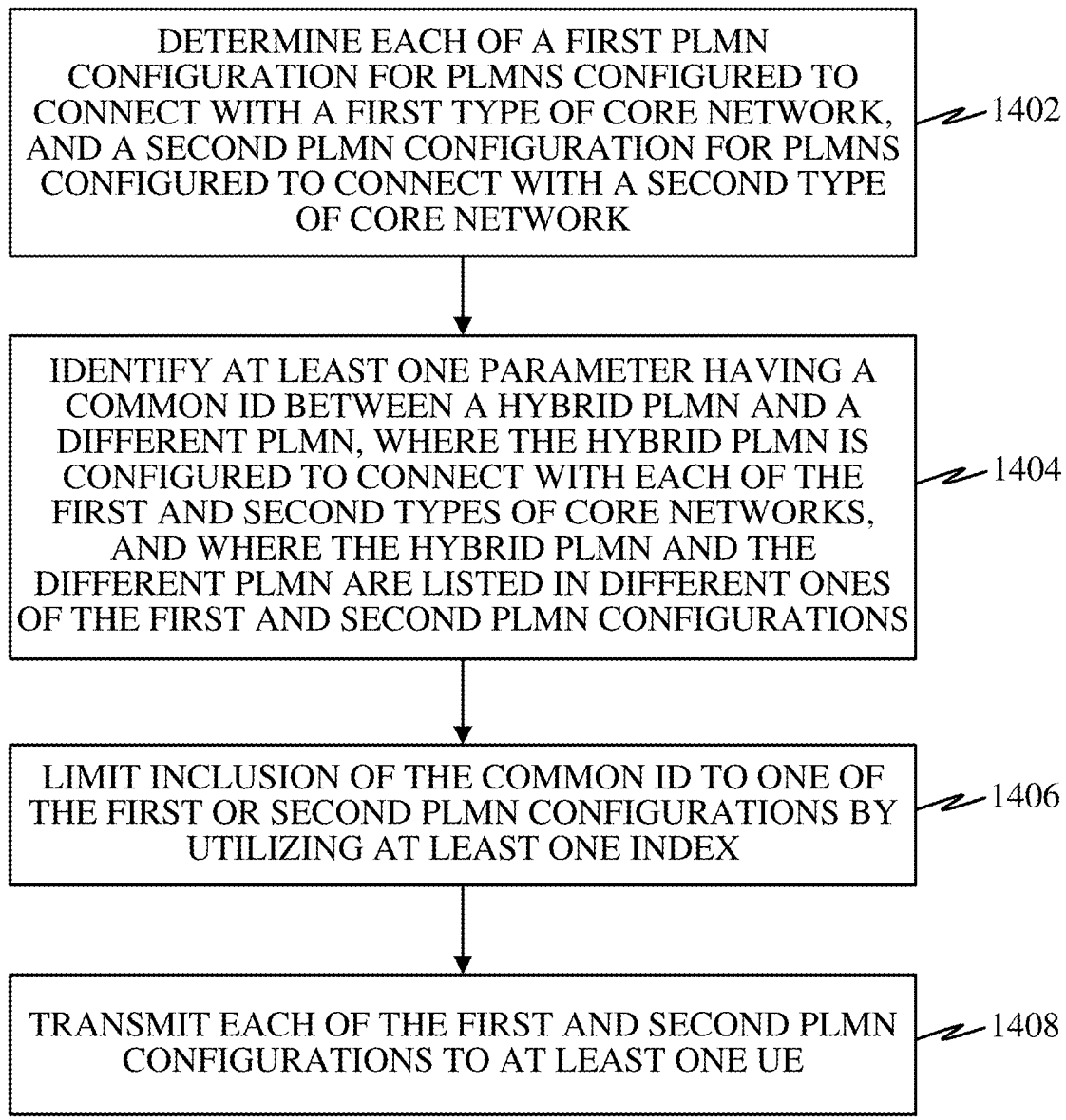
FIG. 14 is a flow diagram illustrating at least one example of a method operational on a scheduling entity.

FIG. 14 is a flow diagram illustrating at least one example of a method operational on a scheduling entity, such as the scheduling entity 1300. Referring to FIGS. 13 and 14, a scheduling entity 1300 may determine each of a first PLMN configuration directed towards PLMNs configured to connect with a first type of core network, and a second PLMN configuration directed towards PLMNs configured to connect with a second type of core network, at operation 1402. For example, the scheduling entity 1300 may include logic (e.g., determining circuit/module 1318 and/or determining operations 1324) to determine each of a first public land mobile network (PLMN) configuration and a second PLMN configuration, where the first PLMN configuration is directed towards PLMNs configured to connect with a first type of core network, and the second PLMN configuration is directed towards PLMNs configured to connect with a second type of core network. In at least one example, the first PLMN configuration may be an Evolved Packet Core (EPC) PLMN configuration directed towards an EPC network, and the second PLMN configuration may be a Fifth-Generation Core (5GC) PLMN configuration directed towards a 5GC network.

In some implementations, if all PLMNs are exclusively directed towards a 5GC network, the scheduling entity 1300 may include logic (e.g., determining circuit/module 1318 and/or determining operations 1324) to configure the EPC PLMN configuration to include a placeholder PLMN (e.g., including a placeholder TAC and/or a placeholder Cell ID.

In some implementations, the scheduling entity 1300 may include logic (e.g., determining circuit/module 1318 and/or determining operations 1324) to configure the EPC PLMN configuration to include a 5GC extension for each listed PLMN. If all PLMNs are exclusively directed towards a 5GC network, the scheduling entity 1300 may include logic (e.g., determining circuit/module 1318 and/or determining operations 1324) to configure the EPC PLMN configuration to include a placeholder PLMN (e.g., including a placeholder tracking area code (TAC) and/or a placeholder cell identifier (Cell ID)).

At 1404, the scheduling entity 1300 may identify at least one parameter having a common identifier between a hybrid PLMN and a different PLMN in which the hybrid PLMN is configured to connect with each of the first type of core network and the second type of core network, and in which the hybrid PLMN and the different PLMN are listed in different ones of the first PLMN configuration and the second PLMN configuration. For example, the scheduling entity 1300 may include logic (e.g., identifying circuit/module 1320 and/or identifying operations 1326) to identify at least one parameter having a common identifier between the hybrid PLMN and the different PLMN.

As noted above, in some implementations all PLMNs may be exclusively directed towards a 5GC network, and the scheduling entity 1300 may configure the EPC PLMN configuration to include a placeholder PLMN. In such implementations, the scheduling entity 1300 may include logic (e.g., identifying circuit/module 1320 and/or identifying operations 1326) to list the different PLMN in the 5GC PLMN configuration with the common identifier and an index associating the common identifier with the hybrid PLMN.

As also noted above, some implementations may involve the EPC PLMN configuration including a 5GC extension for each listed PLMN. If such a 5GC extension is used, the scheduling entity 1300 may include logic (e.g., identifying circuit/module 1320 and/or identifying operations 1326) to list the hybrid PLMN in the EPC PLMN configuration with an empty 5GC extension. In such an implementation, the scheduling entity 1300 may include logic (e.g., identifying circuit/module 1320 and/or identifying operations 1326) to further list the different PLMN in the 5GC PLMN configuration with the common identifier and an index associating the common identifier with the hybrid PLMN.

Alternatively, the scheduling entity 1300 may include logic (e.g., identifying circuit/module 1320 and/or identifying operations 1326) to list the hybrid PLMN in the EPC PLMN configuration with the common identifier included in the 5GC extension. In such an implementation, the scheduling entity 1300 may include logic (e.g., identifying circuit/module 1320 and/or identifying operations 1326) to further list the different PLMN in the 5GC PLMN configuration with an index associating the different PLMN with the common identifier included in the 5GC extension of the hybrid PLMN.

In some implementations, the scheduling entity 1300 may include logic (e.g., identifying circuit/module 1320 and/or identifying operations 1326) to identify at least a second parameter having a second common identifier between the hybrid PLMN and the different PLMN (e.g., a Cell ID).

At 1406, the scheduling entity 1300 may limit inclusion of the common identifier to one of the first PLMN configuration or the second PLMN configuration by utilizing at least one index. For example, the scheduling entity 1300 may include logic (e.g., limiting circuit/module 1322 and/or limiting operations 1328) to limit inclusion of the common identifier to one of the first or second PLMN configuration by utilizing at least one index. In some implementations, the scheduling entity 1300 may include logic (e.g., limiting circuit/module 1322 and/or limiting operations 1328) to list the different PLMN in the 5GC PLMN configuration with the common identifier and an index associating the common identifier with the hybrid PLMN.

As noted herein, implementations may include the EPC configuration being configured to include a 5GC extension for each listed PLMN. In at least one implementation, the scheduling entity 1300 may include logic (e.g., limiting circuit/module 1322 and/or limiting operations 1328) to list the hybrid PLMN in the EPC PLMN configuration with an empty 5GC extension, and list the different PLMN in the 5GC PLMN configuration with the common identifier and an index associating the common identifier with the hybrid PLMN. In at least one implementation, the scheduling entity 1300 may include logic (e.g., limiting circuit/module 1322 and/or limiting operations 1328) to list the hybrid PLMN in the EPC PLMN configuration with the common identifier included in the 5GC extension, and list the different PLMN in the 5GC PLMN configuration with an index associating the different PLMN with the common identifier included in the 5GC extension of the hybrid PLMN.

In the example noted above where the scheduling entity 1300 identifies at least a second parameter having a second common identifier between the hybrid PLMN and the different PLMN (e.g., a Cell ID), the scheduling entity 1300 may further include logic (e.g., limiting circuit/module 1322 and/or limiting operations 1328) to limit an inclusion of the second common identifier to one of the EPC PLMN configuration or the 5GC PLMN configuration by utilizing the at least one index.

At 1408, the scheduling entity 1300 transmits each of the first PLMN configuration and the second PLMN configuration to at least one user equipment. For example, the scheduling entity 1300 may include logic (e.g., processing circuit 1306) to transmit each of the first PLMN configuration and the second PLMN configuration via the transceiver 1314 to one or more UEs.

Figure 15:
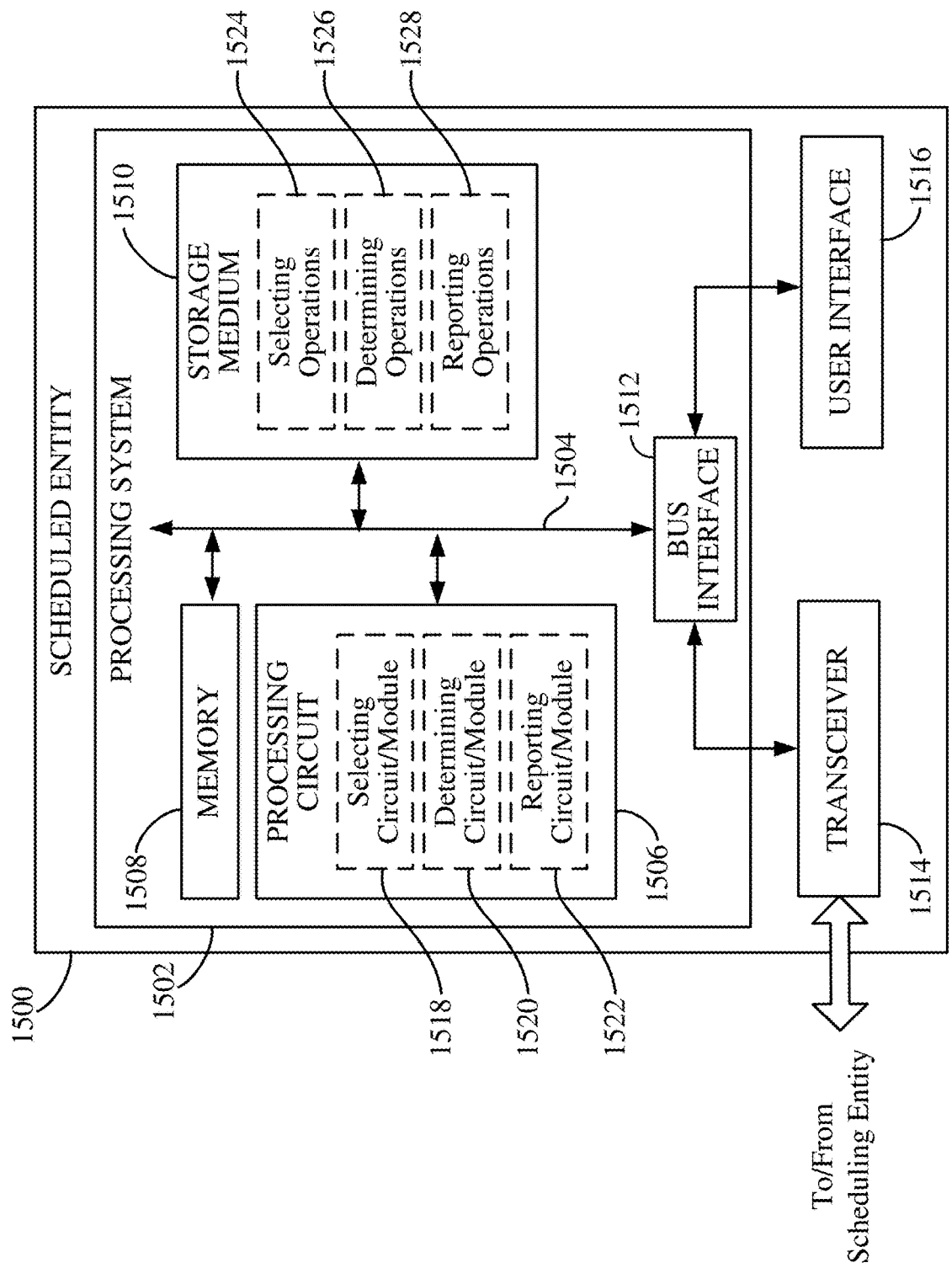
FIG. 15 is a block diagram illustrating select components of a scheduled entity employing a processing system according to at least one example of the present disclosure.

Turning now to FIG. 15, a block diagram is shown illustrating select components of a scheduled entity 1500 employing a processing system 1502 according to at least one example of the present disclosure. Similar to the processing system 1302 in FIG. 13, the processing system 1502 may be implemented with a bus architecture, represented generally by the bus 1504. The bus 1504 may include any number of interconnecting buses and bridges depending on the specific application of the processing system 1502 and the overall design constraints. The bus 1504 communicatively couples together various circuits including one or more processors (represented generally by the processing circuit 1506), a memory 1508, and computer-readable media (represented generally by the storage medium 1510). The bus 1504 may also link various other circuits such as timing sources, peripherals, voltage regulators, and power management circuits, which are well known in the art, and therefore, will not be described any further. A bus interface 1512 provides an interface between the bus 1504 and a transceiver 1514. The transceiver 1514 provides a means for communicating with various other apparatus over a transmission medium. Depending upon the nature of the apparatus, a user interface 1516 (e.g., keypad, display, speaker, microphone, joystick) may also be provided.

The processing circuit 1506 is responsible for managing the bus 1504 and general processing, including the execution of programming stored on the computer-readable storage medium 1510. The programming, when executed by the processing circuit 1506, causes the processing system 1502 to perform the various functions described below for any particular apparatus. The computer-readable storage medium 1510 and the memory 1508 may also be used for storing data that is manipulated by the processing circuit 1506 when executing programming.

The processing circuit 1506 is arranged to obtain, process and/or send data, control data access and storage, issue commands, and control other desired operations. The processing circuit 1506 may include circuitry adapted to implement desired programming provided by appropriate media in at least one example, and/or circuitry adapted to perform one or more functions described in this disclosure. The processing circuit 1506 may be implemented and/or configured according to any of the examples of the processing circuit 1306 described above.

In some instances, the processing circuit 1506 may include a selecting circuit and/or module 1518, a determining circuit and/or module 1520, and/or a reporting circuit and/or module 1522. The selecting circuit/module 1518 may generally include circuitry and/or programming (e.g., programming stored on the storage medium 1510) adapted to select a hybrid PLMN included in one of a first PLMN configuration or a second PLMN configuration, wherein the hybrid PLMN is configured to connect with each of a first type of core network and a second type of core network, as described in more detail hereinafter. The determining circuit/module 1520 may generally include circuitry and/or programming (e.g., programming stored on the storage medium 1510) adapted to determine whether the hybrid PLMN will be used to connect with the first type of core network or the second type of core network, as described in more detail hereinafter. The reporting circuit/module 1522 may generally include circuitry and/or programming (e.g., programming stored on the storage medium 1510) adapted to report whether a parameter associated with the hybrid PLMN was ascertained via the first PLMN configuration or the second PLMN configuration, where a reporting of the parameter facilitates an indication of whether the hybrid PLMN is connected to the first type of core network or the second type of core network, as described in more detail hereinafter. As noted previously, reference to circuitry and/or programming may be generally referred to as logic (e.g., logic gates and/or data structure logic).

The storage medium 1510 may represent one or more computer-readable devices for storing programming, such as processor executable code or instructions (e.g., software, firmware), electronic data, databases, or other digital information. The storage medium 1510 may be configured and/or implemented in a manner similar to the storage medium 1310 described above.

Programming stored by the storage medium 1510, when executed by the processing circuit 1506, can cause the processing circuit 1506 to perform one or more of the various functions and/or process steps described herein. In at least some examples, the storage medium 1510 may include selecting operations 1524, determining operations 1526, and/or reporting operations 1528. The selecting operations 1524 are generally adapted to cause the processing circuit 1506 to select a hybrid PLMN included in one of a first PLMN configuration or a second PLMN configuration, where the hybrid PLMN is configured to connect with each of a first type of core network and a second type of core network, as described herein. The determining operations 1526 are generally adapted to cause the processing circuit 1506 to determine whether the hybrid PLMN will be used to connect with the first type of core network or the second type of core network, as described herein. The reporting operations 1528 are generally adapted to cause the processing circuit 1506 to report whether a parameter associated with the hybrid PLMN was ascertained via the first PLMN configuration or the second PLMN configuration, where a reporting of the parameter facilitates an indication of whether the hybrid PLMN is connected to the first type of core network or the second type of core network, as described herein.

Thus, according to one or more aspects of the present disclosure, the processing circuit 1506 is adapted to perform (independently or in conjunction with the storage medium 1510) any or all of the processes, functions, steps and/or routines for any or all of the scheduled entities described herein (e.g., scheduled entity 106, UE 222, 224, 226, 228, 230, 232, 234, 236, 238, 240, and 242, scheduled entity 1500). As used herein, the term "adapted" in relation to the processing circuit 1506 may refer to the processing circuit 1506 being one or more of configured, employed, implemented, and/or programmed (in conjunction with the storage medium 1510) to perform a particular process, function, step and/or routine according to various features described herein.

Figure 16:
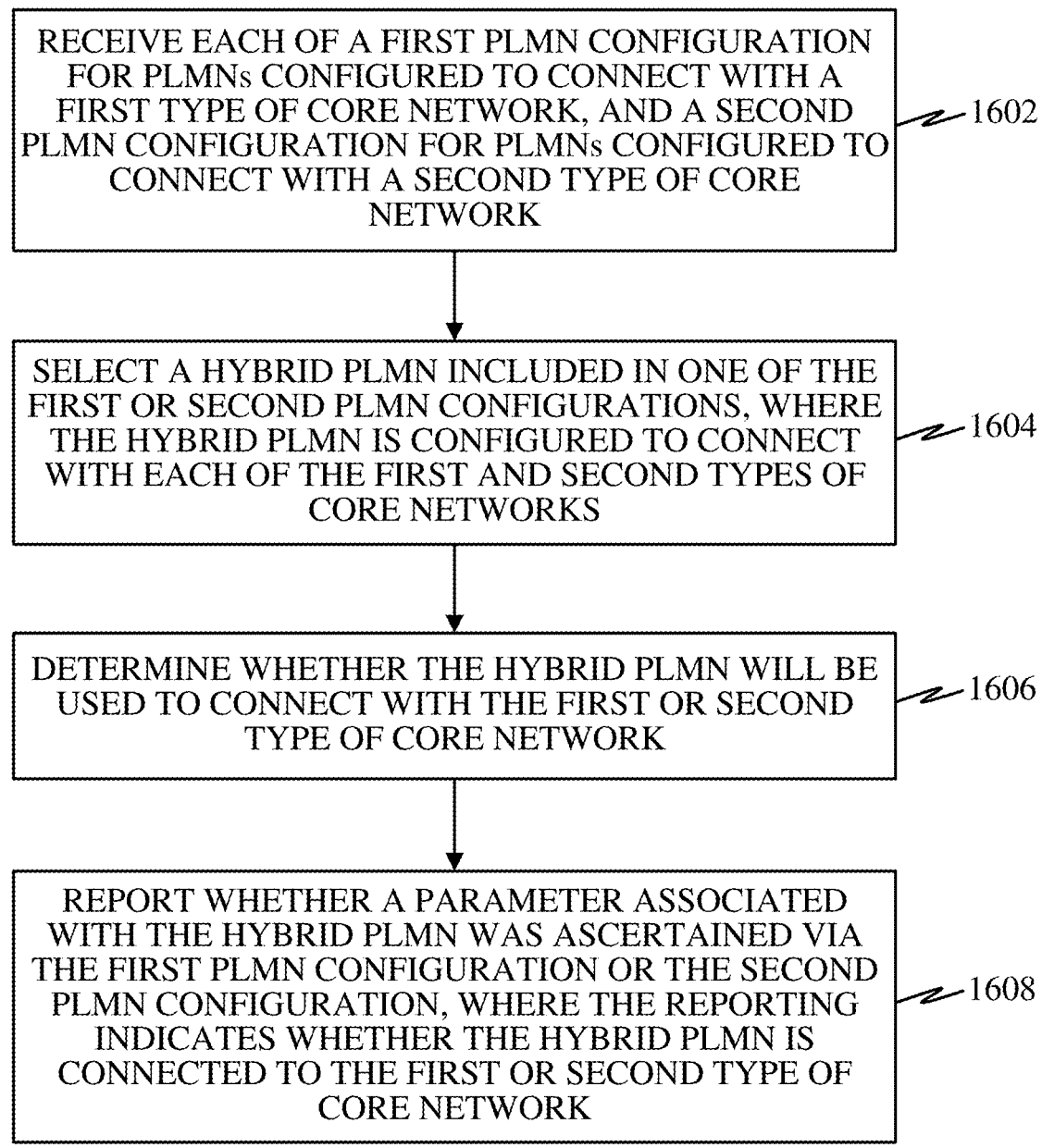
FIG. 16 is a flow diagram illustrating at least one example of a method operational on a scheduled entity.

FIG. 16 is a flow diagram illustrating at least one example of a method operational on a scheduled entity, such as the scheduled entity 1500. Referring to FIGS. 15 and 16, a scheduled entity 1500 may receive, at operation 1602, each of a first PLMN configuration directed towards PLMNs configured to connect with a first type of core network, and a second PLMN configuration directed towards PLMNs configured to connect with a second type of core network. For example, the scheduled entity 1500 may include logic (e.g., processing circuit 1506) to receive the first and second PLMN configurations via the transceiver 1514. According to at least one implementation, the first PLMN configuration may be an EPC PLMN configuration directed towards an EPC network, and the second PLMN configuration may be a 5GC PLMN configuration directed towards a 5GC network.

At 1604, the scheduled entity 1500 may select a hybrid PLMN included in one of the first PLMN configuration or the second PLMN configuration such that the hybrid PLMN is configured to connect with each of the first type of core network and the second type of core network. For example, the scheduled entity 1500 may include logic (e.g., selecting circuit/module 1518, selecting operations 1524) to select a hybrid PLMN included in one of the first PLMN configuration or the second PLMN configuration.

At 1606, the scheduled entity 1500 may determine whether the hybrid PLMN will be used to connect with the first type of core network or the second type of core network. For example, the scheduled entity 1500 may include logic (e.g., determining circuit/module 1520, determining operations 1526) to determine whether the hybrid PLMN will be used to connect with the first type of core network or the second type of core network.

At 1608, the scheduled entity 1500 may report whether a parameter associated with the hybrid PLMN was ascertained via the first PLMN configuration or the second PLMN configuration such that the reporting facilitates an indication of whether the hybrid PLMN is connected to the first type of core network or the second type of core network. For example, the scheduled entity 1500 may include logic (e.g., reporting circuit/module 1522, reporting operations 1528) to report via the transceiver 1514 whether a parameter associated with the hybrid PLMN was ascertained via the first PLMN configuration or the second PLMN configuration.

In at least one implementation, the hybrid PLMN may be listed in the EPC PLMN configuration. In such implementations, the scheduled entity 1500 may include logic (e.g., reporting circuit/module 1522, reporting operations 1528) to report via the transceiver 1514 a use of an index included in the 5GC PLMN configuration, where the use of the index included in the 5GC PLMN configuration indicates that the hybrid PLMN is connected to the 5GC network. For instance, the scheduled entity 1500 may include logic (e.g., reporting circuit/module 1522, reporting operations 1528) to configure a reporting parameter to further include an identification of the index.

In at least some implementations, the scheduled entity 1500 may include logic (e.g., reporting circuit/module 1522, reporting operations 1528) to configure a second reporting parameter to include an explicit indication of whether the hybrid PLMN was selected from the EPC PLMN configuration or the 5GC PLMN configuration. In other implementations, the scheduled entity 1500 may include logic (e.g., reporting circuit/module 1522, reporting operations 1528) to configure a second reporting parameter to include an implicit indication of whether the hybrid PLMN was selected from the EPC PLMN configuration or the 5GC PLMN configuration.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features, parameters, and/or functions illustrated in FIGS. 1, 2, 3, 4, 5, 6, 7, 8, 9, 10, 11, 12, 13, 14, 15, and/or 16 may be rearranged and/or combined into a single component, step, feature, parameter, or function or embodied in several components, steps, parameters, or functions. Additional elements, components, steps, parameters, and/or functions may also be added or not utilized without departing from the novel features of the present disclosure. The apparatus, devices and/or components illustrated in FIGS. 1, 2, 13, and/or 15 may be configured to perform or employ one or more of the methods, features, parameters, and/or steps described herein with reference to FIGS. 3, 4, 5, 6, 7, 8, 9, 10, 11, 12, 14, and/or 16. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device comprising:
   a transceiver;
   a memory; and
   a processor communicatively coupled to the transceiver and the memory, the processor configured to:
      determine each of a first public land mobile network (PLMN) configuration and a second PLMN configuration, the first PLMN configuration directed towards PLMNs configured to connect with a first type of core network, and the second PLMN configuration directed towards PLMNs configured to connect with a second type of core network;
      identify at least one parameter having a common identifier between a hybrid PLMN and a different PLMN, the hybrid PLMN configured to connect with each of the first type of core network and the second type of core network, wherein the hybrid PLMN and the different PLMN are listed in different ones of the first PLMN configuration and the second PLMN configuration;
      limit an inclusion of the common identifier to one of the first PLMN configuration or the second PLMN configuration by utilizing at least one index; and
      transmit via the transceiver each of the first PLMN configuration and the second PLMN configuration to at least one user equipment.

2. The wireless communication device of claim 1, wherein the first PLMN configuration is an Evolved Packet Core (EPC) PLMN configuration directed towards an EPC network, and wherein the second PLMN configuration is a Fifth-Generation Core (5GC) PLMN configuration directed towards a 5GC network.

3. The wireless communication device of claim 2, wherein the processor configured to determine each of the first PLMN configuration and the second PLMN configuration comprises the processor configured to:
   configure the EPC PLMN configuration to include a 5GC extension for each listed PLMN.

4. The wireless communication device of claim 2, wherein the processor configured to limit an inclusion of the common identifier to one of the first PLMN configuration or the second PLMN configuration by utilizing at least one index comprises the processor configured to:
   list the different PLMN in the 5GC PLMN configuration with the common identifier and an index associating the common identifier with the hybrid PLMN.

5. The wireless communication device of claim 2, wherein:
   the processor configured to identify at least one parameter having a common identifier between the hybrid PLMN and the different PLMN comprises the processor configured to identify at least a second parameter having a second common identifier between the hybrid PLMN and the different PLMN; and
   the processor configured to limit an inclusion of the common identifier to one of the first PLMN configuration or the second PLMN configuration by utilizing at least one index comprises the processor configured to limit an inclusion of the second common identifier to one of the EPC PLMN configuration or the 5GC PLMN configuration by utilizing the at least one index.

6. The wireless communication device of claim 1, wherein the at least one parameter is a tracking area code (TAC).

7. A method of wireless communication, comprising:
   determining each of a first public land mobile network (PLMN) configuration and a second PLMN configuration, the first PLMN configuration directed towards PLMNs configured to connect with a first type of core network, and the second PLMN configuration directed towards PLMNs configured to connect with a second type of core network;
   identifying at least one parameter having a common identifier between a hybrid PLMN and a different PLMN, wherein the hybrid PLMN is configured to connect with each of the first type of core network and the second type of core network, and wherein the hybrid PLMN and the different PLMN are listed in different ones of the first PLMN configuration and the second PLMN configuration;
   limiting an inclusion of the common identifier to one of the first PLMN configuration or the second PLMN configuration by utilizing at least one index; and
   transmitting each of the first PLMN configuration and the second PLMN configuration to at least one user equipment.

8. The method of claim 7, wherein the first PLMN configuration is an Evolved Packet Core (EPC) PLMN configuration directed towards an EPC network, and wherein the second PLMN configuration is a Fifth-Generation Core (5GC) PLMN configuration directed towards a 5GC network.

9. The method of claim 8, wherein determining each of the first PLMN configuration and the second PLMN configuration comprises:
   configuring the EPC PLMN configuration to include a 5GC extension for each listed PLMN.

10. The method of claim 9, further comprising:
    configuring the EPC PLMN configuration to include a placeholder PLMN when all PLMNs are exclusively directed towards a 5GC network.

11. The method of claim 10, further comprising:
    configuring the placeholder PLMN to include at least one of a placeholder tracking area code (TAC) or a placeholder cell identifier (Cell ID).

12. The method of claim 9, wherein limiting an inclusion of the common identifier to one of the first PLMN configuration or the second PLMN configuration by utilizing at least one index comprises:
    listing the hybrid PLMN in the EPC PLMN configuration with an empty 5GC extension; and
    listing the different PLMN in the 5GC PLMN configuration with the common identifier and an index associating the common identifier with the hybrid PLMN.

13. The method of claim 9, wherein limiting an inclusion of the common identifier to one of the first PLMN configuration or the second PLMN configuration by utilizing at least one index comprises:
    listing the hybrid PLMN in the EPC PLMN configuration with the common identifier included in the 5GC extension; and
    listing the different PLMN in the 5GC PLMN configuration with an index associating the different PLMN with the common identifier included in the 5GC extension of the hybrid PLMN.

14. The method of claim 8, wherein limiting an inclusion of the common identifier to one of the first PLMN configuration or the second PLMN configuration by utilizing at least one index comprises:

listing the different PLMN in the 5GC PLMN configuration with the common identifier and an index associating the common identifier with the hybrid PLMN.

15. The method of claim 14, further comprising configuring the EPC PLMN configuration to include a placeholder PLMN when all PLMNs are exclusively directed towards a 5GC network.

16. The method of claim 15, further comprising configuring the placeholder PLMN to include at least one of a placeholder tracking area code (TAC) or a placeholder cell identifier (Cell ID).

17. The method of claim 8, wherein:
identifying at least one parameter having a common identifier between the hybrid PLMN and the different PLMN comprises identifying at least a second parameter having a second common identifier between the hybrid PLMN and the different PLMN; and
limiting an inclusion of the common identifier to one of the first PLMN configuration or the second PLMN configuration by utilizing at least one index comprises further comprises limiting an inclusion of the second common identifier to one of the EPC PLMN configuration or the 5GC PLMN configuration by utilizing the at least one index.

18. The method of claim 17, wherein the second parameter is a cell identifier (Cell ID).

19. A wireless communication device, comprising:
a transceiver;
a memory; and
a processor communicatively coupled to the transceiver and the memory, the processor configured to:
receive via the transceiver each of a first public land mobile network (PLMN) configuration and a second PLMN configuration, the first PLMN configuration directed towards PLMNs configured to connect with a first type of core network, and the second PLMN configuration directed towards PLMNs configured to connect with a second type of core network;
select a hybrid PLMN included in one of the first PLMN configuration or the second PLMN configuration, wherein the hybrid PLMN is configured to connect with each of the first type of core network and the second type of core network;
determine whether the hybrid PLMN will be used to connect with the first type of core network or the second type of core network; and
report via the transceiver whether a parameter associated with the hybrid PLMN was ascertained via the first PLMN configuration or the second PLMN configuration, wherein a reporting of the parameter facilitates an indication of whether the hybrid PLMN is connected to the first type of core network or the second type of core network.

20. The wireless communication device of claim 19, wherein the first PLMN configuration is an Evolved Packet Core (EPC) PLMN configuration directed towards an EPC network, and wherein the second PLMN configuration is a Fifth-Generation Core (5GC) PLMN configuration directed towards a 5GC network.

21. The wireless communication device of claim 20, wherein the hybrid PLMN is listed in the EPC PLMN configuration, and wherein the processor configured to report whether the parameter associated with the hybrid PLMN was ascertained via the first PLMN configuration or the second PLMN configuration comprises the processor configured to:
report a use of an index included in the 5GC PLMN configuration, the use of the index included in the 5GC PLMN configuration indicating that the hybrid PLMN is connected to the 5GC network.

22. The wireless communication device of claim 21, wherein the processor configured to report whether the parameter associated with the hybrid PLMN was ascertained via the first PLMN configuration or the second PLMN configuration comprises the processor configured to:
configure a reporting parameter to further include an identification of the index.

23. The wireless communication device of claim 22, wherein the processor configured to report whether the parameter associated with the hybrid PLMN was ascertained via the first PLMN configuration or the second PLMN configuration comprises the processor configured to:
configure a second reporting parameter to include an explicit indication of whether the hybrid PLMN was selected from the EPC PLMN configuration or the 5GC PLMN configuration.

24. The wireless communication device of claim 22, wherein the processor configured to report whether the parameter associated with the hybrid PLMN was ascertained via the first PLMN configuration or the second PLMN configuration comprises the processor configured to:
configure a second reporting parameter to include an implicit indication of whether the hybrid PLMN was selected from the EPC PLMN configuration or the 5GC PLMN configuration.

25. A method of wireless communication, comprising:
receiving each of a first public land mobile network (PLMN) configuration and a second PLMN configuration, the first PLMN configuration directed towards PLMNs configured to connect with a first type of core network, and the second PLMN configuration directed towards PLMNs configured to connect with a second type of core network;
selecting a hybrid PLMN included in one of the first PLMN configuration or the second PLMN configuration, wherein the hybrid PLMN is configured to connect with each of the first type of core network and the second type of core network;
determining whether the hybrid PLMN will be used to connect with the first type of core network or the second type of core network; and
reporting whether a parameter associated with the hybrid PLMN was ascertained via the first PLMN configuration or the second PLMN configuration, the reporting facilitating an indication of whether the hybrid PLMN is connected to the first type of core network or the second type of core network.

26. The method of claim 25, wherein the first PLMN configuration is an Evolved Packet Core (EPC) PLMN configuration directed towards an EPC network, and wherein the second PLMN configuration is a Fifth-Generation Core (5GC) PLMN configuration directed towards a 5GC network.

27. The method of claim 26, wherein the hybrid PLMN is listed in the EPC PLMN configuration, and wherein reporting whether the parameter associated with the hybrid PLMN was ascertained via the first PLMN configuration or the second PLMN configuration comprises:
reporting a use of an index included in the 5GC PLMN configuration, the use of the index included in the 5GC PLMN configuration indicating that the hybrid PLMN is connected to the 5GC network.

28. The method of claim 27, wherein reporting whether the parameter associated with the hybrid PLMN was ascertained via the first PLMN configuration or the second PLMN configuration comprises:

configuring a reporting parameter to further include an identification of the index.

29. The method of claim 28, wherein reporting whether the parameter associated with the hybrid PLMN was ascertained via the first PLMN configuration or the second PLMN configuration comprises:

configuring a second reporting parameter to include an explicit indication of whether the hybrid PLMN was selected from the EPC PLMN configuration or the 5GC PLMN configuration.

30. The method of claim 28, wherein reporting whether the parameter associated with the hybrid PLMN was ascertained via the first PLMN configuration or the second PLMN configuration further comprises:

configuring a second reporting parameter to include an implicit indication of whether the hybrid PLMN was selected from the EPC PLMN configuration or the 5GC PLMN configuration.

\* \* \* \* \*